United States Patent
Rangel et al.

(10) Patent No.: US 10,554,146 B2
(45) Date of Patent: *Feb. 4, 2020

(54) RF-TO-DC CONVERTER

(71) Applicant: DRAYSON TECHNOLOGIES (EUROPE) LIMITED, London (GB)

(72) Inventors: Manuel Pinuela Rangel, London (GB); Bruno Roberto Franciscatto, London (GB)

(73) Assignee: DRAYSON TECHNOLOGIES (EUROPE) LIMITED, London (GB)

( * ) Notice: Subject to any disclaimer, the term of this patent is extended or adjusted under 35 U.S.C. 154(b) by 136 days.

This patent is subject to a terminal disclaimer.

(21) Appl. No.: 15/760,084

(22) PCT Filed: Sep. 13, 2016

(86) PCT No.: PCT/GB2016/052825
§ 371 (c)(1),
(2) Date: Mar. 14, 2018

(87) PCT Pub. No.: WO2017/046580
PCT Pub. Date: Mar. 23, 2017

(65) Prior Publication Data
US 2018/0254714 A1 Sep. 6, 2018

(30) Foreign Application Priority Data

Sep. 14, 2015 (GB) .................... 1516282.9

(51) Int. Cl.
*H02M 7/06* (2006.01)
*H02J 50/20* (2016.01)
(Continued)

(52) U.S. Cl.
CPC ............. *H02M 7/06* (2013.01); *H01P 1/20* (2013.01); *H01Q 1/24* (2013.01); *H02J 50/20* (2016.02)

(58) Field of Classification Search
CPC .... H02M 7/06; H01P 1/20; H01Q 1/24; H02J 50/20
See application file for complete search history.

(56) References Cited

U.S. PATENT DOCUMENTS 4,079,268 A 3/1978 Fletcher et al.
8,326,256 B1 * 12/2012 Kuhn ................. G06K 19/0709
327/536

(Continued)

FOREIGN PATENT DOCUMENTS

WO 2015/019106 A2 2/2015
WO 2015/089437 A1 6/2015

OTHER PUBLICATIONS

Suh et al., "A High-Efficiency Dual-Frequency Rectenna for 2.45- and 5.8-GHz Wireless Power Transmission," (2002) IEEE Transcations on Microwave Theory and Techniques, 50(7):1784-1789.

(Continued)

*Primary Examiner* — Daniel Kessie
(74) *Attorney, Agent, or Firm* — Benjamin C. Pelletier; Venable LLP

(57) ABSTRACT

There is provided a dual-band converter operable to convert a first RF signal in a first frequency band and a second RF signal in a second frequency band that is separate from the first frequency band into a DC signal for powering a load. The converter comprises: a rectifier arranged to generate, based on the first and second RF signals, the DC signal and two or more harmonics of each of the first and second RF signals during operation of the dual-band converter; a planar transmission line arranged to guide the first and second RF signals to the rectifier and to receive a component of each of the harmonics generated by the rectifier during operation of the dual-band converter; a first stub and a second stub each connected to the planar transmission line and arranged to reflect, during operation of the dual-band converter, a com- (Continued)

ponent of a first harmonic and a component of a second harmonic of the first RF signal received from the rectifier, respectively; and a third stub and a fourth stub each connected to the planar transmission line and arranged to reflect, during operation of the dual-band converter, a component of a first harmonic and a component of a second harmonic of the second RF signal received from the rectifier, respectively.

20 Claims, 15 Drawing Sheets

(51) Int. Cl.
*H01P 1/20* (2006.01)
*H01Q 1/24* (2006.01)

(56) References Cited

U.S. PATENT DOCUMENTS 9,837,865 B2 * 12/2017 Mitcheson ............. H01Q 1/248
2009/0044399 A1 * 2/2009 Quil ..................... H01Q 13/085
29/600
2010/0309078 A1 * 12/2010 Rofougaran ........... H01Q 1/248
343/776
2016/0094091 A1 * 3/2016 Shin ....................... H02J 17/00
307/104
2016/0181867 A1 * 6/2016 Daniel ................... H02J 50/27
307/104

OTHER PUBLICATIONS

Ladan et al., "Towards Millimeter-Wave High-Efficiency Rectification for Wireless Energy Harvesting," (2013) IEEE International Wireless Symposium, pp. 1-4.
Shinki et al., "Wireless Power Transmission Circuit on a Small Planar Wide-Band Antenna," (2013) IEEE International Conference of IEEE Region 10, pp. 1-4.
Shin et al., "A Compact and Wideband Circularly Polarized Rectenna with High Efficiency at X-Band," (2014) Progess in Electromagnetics Research 145:163-173.

* cited by examiner

RF-TO-DC CONVERTER

CROSS-REFERENCE TO RELATED APPLICATIONS

This application is a national stage entry application filed under 35 USC § 371 of PCT Application PCT/GB2016/052825, filed Sep. 13, 2016, which claims the benefit of priority to GB Application No. 1516282.9, filed Sep. 14, 2015, the entire disclosures of which are hereby incorporated by reference in their entireties.

TECHNICAL FIELD

The present invention generally relates to the field of wireless energy harvesting, and more specifically to a dual-band converter for use in wireless energy harvesting that is configured to rectify radio frequency (RF) signals in separate frequency bands efficiently.

BACKGROUND

The wireless transmission of power has attracted considerable interest over the past century, ever since Nikola Tesla proposed theories of wireless power transmission in the late 1800 s, and can be classified into two broad categories: Wireless Energy Transfer (WET) and Wireless Energy Harvesting (WEH). The former is used for high RF power densities (normally to transfer power from dedicated RF sources over short distances) while the latter relates to the harvesting of the much lower RF power densities that are typically encountered in the urban environment. (e.g. from WiFi and mobile phone networks). WEH systems are generally designed to profit from such freely available RF transmissions by employing highly efficient RF-to-DC conversion to supply low-power devices.

The efficiency, η, of an RF-to-DC converter is defined as:

$$\eta = \frac{P_{OUT}}{P_{IN}}, \quad (1)$$

where $P_{IN}$ is the input RF power and $P_{OUT}$ is the output DC power.

Owing to the very low level of ambient RF transmissions (where $P_{IN}$ is typically zero dBm or less), it is highly desirable for RF-to-DC converters to operate as efficiently as possible, preferably for different RF power sources and/or DC loads. Although some practical dual-band RF-to-DC converters have been developed, which can rectify RF signals from different respective frequency bands, these converters are relatively complex as they comprise two rectifiers (e.g. diodes), each provided with a dedicated waveguide to guide a respective one of the RF signals to the rectifier from an antenna, and usually have several lumped components that limit their efficiency.

SUMMARY

The present invention provides a dual-bang converter for converting a first RF signal in a first frequency band and a second RF signal in a second frequency band that is separate from the first frequency band into a DC signal for powering a load. The dual-band converter comprises a rectifier that is arranged to generate, based on the first and second RF signals, the DC signal and two or more harmonics of each of the first and second RF signals during operation of the dual-band converter. The dual-band converter further comprises a planar transmission line which is arranged to guide the first and second radio frequency signals to the rectifier and to receive a component of each of the harmonics generated by the rectifier during operation of the dual-band converter. The dual-band converter further comprises a first stub and a second stub which are each connected to the planar transmission line and arranged to reflect, during operation of the dual-band converter, a component of a first harmonic and a component of a second harmonic of the first radio frequency signal received from the rectifier, respectively, and a third stub and a fourth stub which are each connected to the planar transmission line and arranged to reflect, during operation of the dual-band converter, a component of a first harmonic and a component of a second harmonic of the second radio frequency signal received from the rectifier, respectively.

The present invention further provides a dual-band RF energy harvesting device, comprising an RF antenna for receiving a first RF signal in a first frequency band and a second RF signal in a second frequency band that is separate from the first frequency band, and a dual-band converter as set out above, which is arranged to convert the RF signals received by the antenna into a DC signal for powering a load.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

Rectifiers that are typically used in WEH to rectify received RF signals are non-linear devices that generate various harmonics of each RF signal (i.e. a first harmonic at $2f_0$ a second harmonic at $3f_0$, etc of each RF signal having fundamental frequency $f_0$) received at an input of an RF-to-DC converter, as well as the DC component that is required to power load circuitry (e.g. a power management module or a battery charging circuit). Significant signal power of these harmonics is usually emitted from the rectifier towards the input of the RF-to-DC converter, as well as to the converter's output. These harmonics, together with a component of the fundamental of the received RF signal that is reflected by the rectifier, are conventionally prevented from passing from the rectifier back to the converter's input by a simple filter circuit that provides a path to ground for these high-frequency signals. The present inventors have recognised that this conventional approach has the draw-back of unnecessarily reducing the efficiency of the dual-band RF-to-DC converter, as it effectively discards RF signals whose power could be harnessed.

There is described in the following a dual-band RF-to-DC converter having a single planar transmission line which is connected to an input side of a single rectifier, and which is provided with reflective stubs to reflect harmonic components emitted by the rectifier back towards the rectifier so that they can contribute to the DC signal output by the rectifier and thus increase the efficiency of the RF-to-DC converter.

Figure 1:
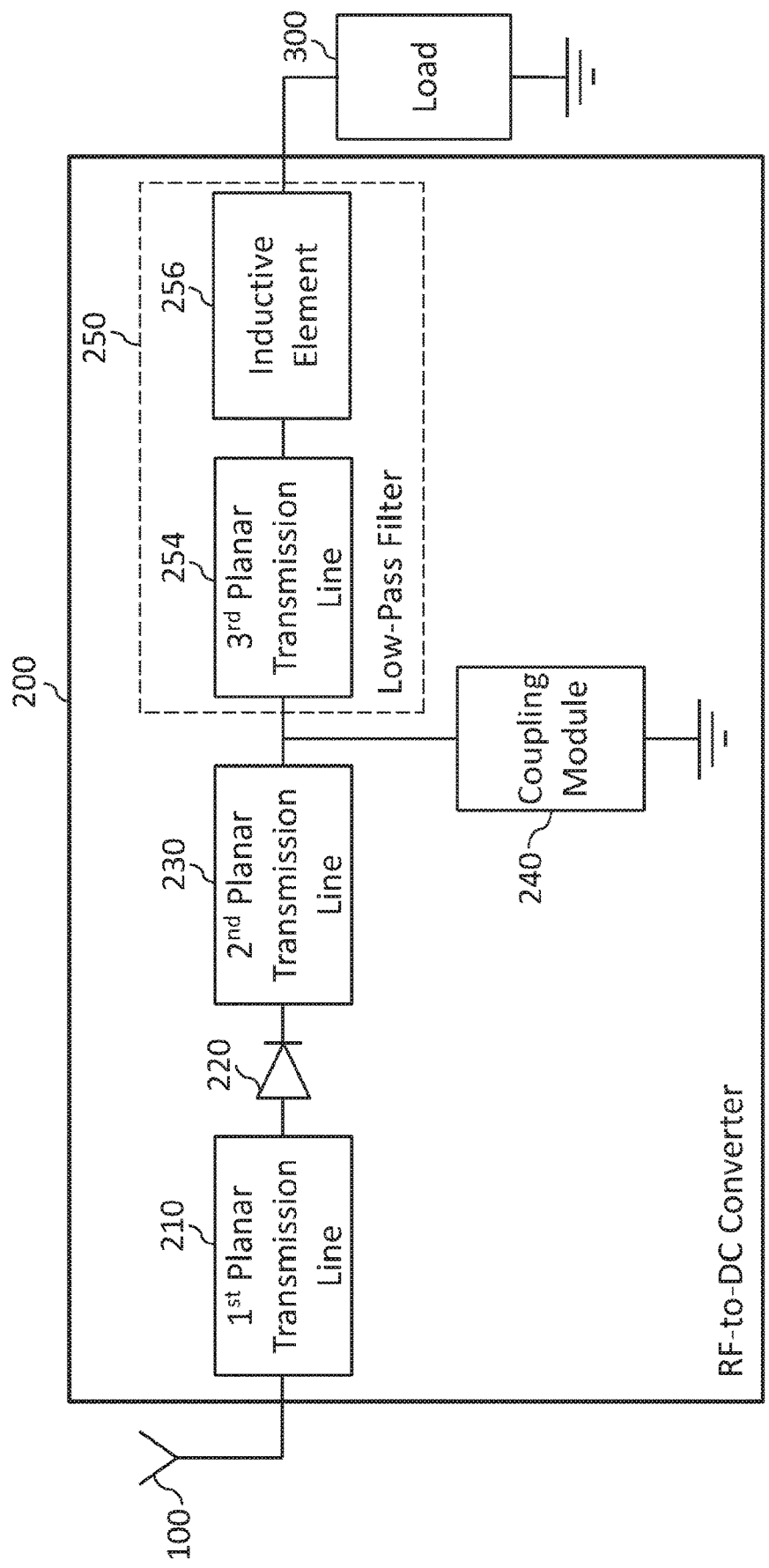
FIG. 1 is schematic illustration of an RF energy harvesting device comprising a dual-band RF-to-DC converter according to an embodiment of the present invention that is connected to an RF antenna and a load.

FIG. 1 is a schematic illustrating components of a dual-band RF energy harvesting device, which comprises a dual-band RF-to-DC converter according to an embodiment of the present invention.

As illustrated in FIG. 1, the dual-band RF energy harvesting device comprises a radio frequency antenna 100 and a dual-band RF-to-DC converter 200, which is arranged to convert RF signals received by the antenna 100 into a DC signal. The RF energy harvesting device may, as in the present embodiment, further comprise a load circuit 300 (such as a power management module (PMM) or a battery charging circuit, for example), which is powered by the DC output of the RF-to-DC converter 200. The dual-band RF-to-DC converter 200 comprises a single first planar transmission line 210 and a single rectifier 220. The dual-band RF-to-DC converter 200 may, as in the present embodiment, further comprise a single second planar transmission line 230, a coupling module 240, and a low-pass filter 250. The low-pass filter 250 comprises a single third planar transmission line 254 and an inductive component 256.

In the present embodiment, RF-to-DC converter 200 is configured to efficiently rectify RF signals in the UHF frequency band (300 MHz to 3 GHz), although it may more generally be configured to operate in one or more of the VHF band (30 MHz to 300 MHz), the UHF frequency band and the SHE frequency band (3 GHz to 30 GHz), based on design considerations well-known to those skilled in the art.

The dual-band RF-to-DC converter 200 is configured to efficiently convert a first RF signal in a first frequency band and a second RF signal in a second frequency band that is separate from the first frequency band into the DC signal. In other words, the RF-to-DC converter 200 is configured to convert RF signals in two different frequency bands spanning respective non-overlapping frequency ranges (i.e. ranges having no common value) to generate the DC signal. As an example, the RF-to-DC converter 200 of the present embodiment is optimised to convert a first RF signal of frequency 2.45 GHz in the WiFi band (2.4 GHz to 2.495 GHz) and a second RF signal of frequency 1840 MHz in the GSM band (1805 MHz to 1880 MHz) into a DC signal for powering the load 300. Signals in these RF frequency bands are of particular interest as they are widely used for wireless communications and are present at appreciable power levels in many populated areas. As such, they tend to provide a reliable source of RF energy. The RF-to-DC converter 200 of the present embodiment is optimized to convert both the aforementioned RF signals with high efficiency when received at a power level of approximately −20 dBm, which is expected to occur in many practical applications, although it is also capable of converting such RF signals with power levels at or below zero dBm.

The antenna 100 may be any antenna suitable for receiving the first and second RF signals, and is preferably impedance-matched to the input impedance of RF-to-DC converter 200, in order to maximise power transferred to the converter. In the present embodiment, the antenna 100 is a dual-band antenna arranged to receive RF signals in each of aforementioned frequency bands (i.e. the 2.4 GHz WiFi band (spanning 2.4 GHz to 2.495 GHz) and the 1800 MHz GSM band, which is between 1805 MHz and 1880 MHz). At both of these frequencies, the impedance of the antenna is around 50Ω. The antenna 100 is preferably as described in UK patent application GB 15 135 65.0, the contents of which are incorporated herein by reference in their entirety.

The first planar transmission line 210 is arranged to receive the RF signals from antenna 100 and to guide the received RF signals to the rectifier 220. The rectifier 220 is arranged to generate, based on these RF signals, a DC signal and one or more harmonics of the RF signals, and to output the generated signals, together with a fundamental component of the RF signals, to the second planar transmission line 230. Where the rectifier 220 receives a first RF signal in a first RF band and a second signal in a second RF band via the antenna 100 and the first planar transmission line 210, as in the present embodiment, the rectifier 220 is arranged to generate, based on the first and second RF signals, the DC signal and two or more harmonics of each of the first and second RF signals during operation of the RF-to-DC converter. The first planar transmission line 210 is thus arranged to receive a component of each of the harmonics generated by the rectifier 220 during operation of the RF-to-DC converter.

Both the first transmission line 210 and the second transmission line 230 are arranged to receive and reflect harmonics of the received RF signals coming from the rectifier 220 back towards the rectifier 220. Due to the configuration and arrangement of the first transmission line 210, the rectifier 220 and the second transmission line 230, components of the received RF signals which are not converted to DC on the first pass through the rectifier 220 are subsequently subjected to DC conversion after being reflected to the input of the rectifier 220, and the RF-to-DC conversion efficiency of the converter 200 is consequently increased in relation to a conventional RF-to-DC converter not having the reflective structure of the present embodiment. It should be noted that an improvement in power conversion efficiency may be achieved even without the second planar transmission line 230 being configured as a reflector for the harmonics, as the first planar transmission line 210 can, on its own, reflect harmonics that contribute to the DC signal output by the rectifier 220.

The first, second and third planar transmission lines may take one of many different forms known to those skilled in the art. For example, each of the first, second and third planar transmission line may be a stripline, microstrip, slotline, coplanar waveguide and a coplanar stripline transmission line, or a combination of two or more of these kinds of transmission line. However, in the present embodiment, each of the first, second and third planar transmission lines takes the form of a microstrip transmission line comprising a respective conductive trace that is formed on a first side of an insulating substrate, wherein a conductive layer providing a ground plane common to all three transmission lines is formed on an opposite side of the substrate.

The guided wavelength, $\lambda_g$, of an electromagnetic wave in a microstrip transmission line differs from the wavelength $\lambda_0$ of the same signal in air according to the following formula:

$$\lambda_g = \frac{\lambda_0}{\sqrt{\varepsilon_{\mathit{eff}}}} \qquad (2)$$

where $\varepsilon_{\mathit{eff}}$ is the effective dielectric constant of the microstrip transmission line, which, for sake of simplicity, is taken to be the relative permittivity of the substrate material in the present disclosure. The guided wavelength may, however, alternatively be expressed in terms of an effective dielectric constant that is a function of the microstrip geometry:

$$\varepsilon_{\mathit{eff}} = \frac{\varepsilon+1}{2} + \frac{\varepsilon-1}{2} * \frac{1}{\sqrt{1+10(h/W)}} \qquad (3)$$

where $\varepsilon$ is the relative permittivity of the substrate, h is the substrate thickness, and W is the width of the conductive trace formed on the substrate. In the following, various dimensions of the RF-to-DC converter of the present embodiment are expressed in terms of both millimetres and $\lambda_g$. The expression of these dimensions in terms of $\lambda_g$ allows the teachings herein to be applied in the design of RF-to-DC converters that can operate at frequencies other than those described. Provided that the relative permittivity of the substrate material is known, the dimensions, in terms of $\lambda_g$, of various components of an RF-to-DC converter having the structure described herein may be deduced from measurements or simulations of how harmonics propagate in the converter, using techniques well-known to those skilled in the art.

In more detail, in the present embodiment, the substrate material is IS680-345 produced by Isola Corp.™, which has a relative permittivity of 3.45 and a loss tangent of 0.0035 at the frequencies of interest. The thickness of the substrate is 0.76 mm. It will, of course, be appreciated that this choice of material is given by way of example only, and that other substrate materials (e.g. RO4003® produced by Rogers Corp.™, which has a relative permittivity of 3.55 and a loss tangent of 0.0027 at the frequencies of interest, or a RO3000® series high-frequency laminate) may alternatively be used. The relative permittivity of the substrate material is preferably between 2.17 to 10.2, and more preferably 3.45, as in the present embodiment. Furthermore, the thickness of the substrate may differ from the most preferred value of 0.76 mm, and may be between 0.125 mm and 1.52 mm.

The conductive trace forming part of the microstrip of each of the first, second and third transmission lines may, as in the present embodiment, be provided in the form of a 35 micron-thick copper layer formed on the substrate. Naturally, a metal or another conductive material other than copper may be used instead, and the thickness of the conductive trace may be varied, preferably in the range between 9 μm and 70 μm.

An example of how the conductive traces of the first, second and third transmission lines of the RF-to-DC converter may be shaped in order to achieve the functionality described herein will now be described with reference to FIGS. 2 to 4.

Figure 2:
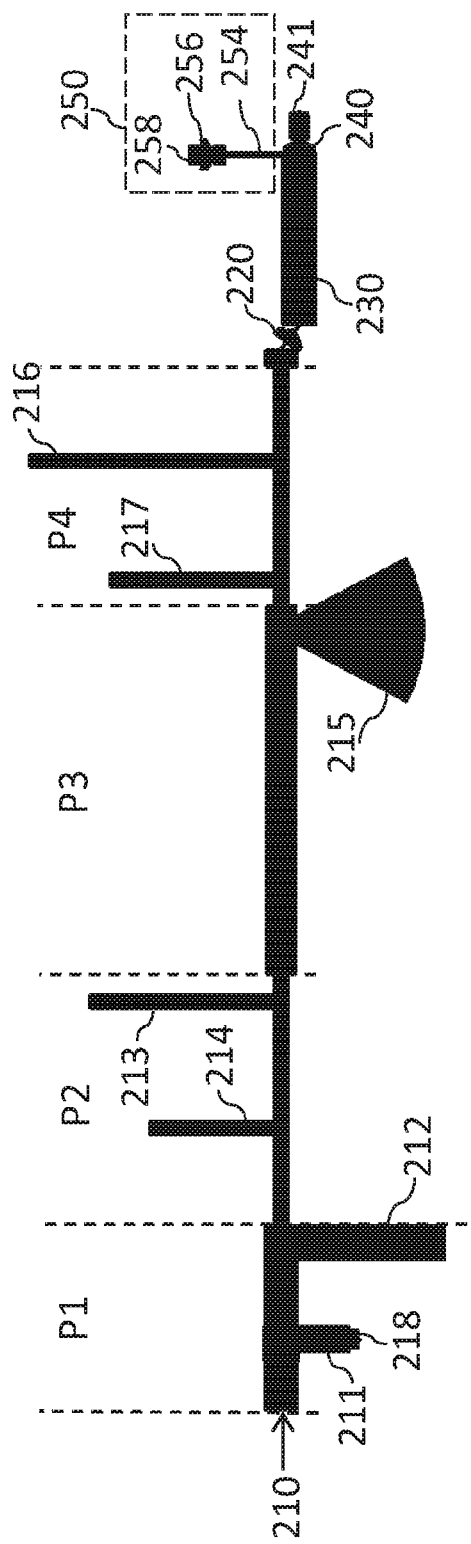
FIG. 2 is a schematic plan view of the RF-to-DC converter of the embodiment, which illustrates the shape of the conductive trace and other components of the converter.

FIG. 2 shows the RF-to-DC converter 200 of the present embodiment in a plan view. For sake of clarity, the substrate and the ground plane of the converter are not shown in FIG. 2, so that the shapes of the conductive traces of the first, second and third transmission lines (labelled 210, 230 and 254 in FIG. 1), and their arrangement in relation to some further components that are described further in the following, can more easily be understood.

The first planar transmission line 210 is provided with an arrangement of stubs that reflect back towards the rectifier 220 components of a first and a second harmonic of each of the aforementioned first and second RF signals that have been emitted by the rectifier 220. More particularly, the dual-band RF-to-DC converter 200 comprises a first stub and a second stub each connected to the first planar transmission line 210 and arranged to reflect, during operation of the dual-band RF-to-DC converter, a component of a first harmonic and a component of a second harmonic of the first RF signal (i.e. the RF signal in the WiFi band mentioned above) received from the rectifier 220, respectively, and further comprises a third stub and a fourth stub each connected to the first planar transmission line 210 and arranged to reflect, during operation of the converter 200, a component of a first harmonic and a component of a second harmonic of the second RF signal (i.e. the RF signal in the GSM band mentioned above) received from the rectifier 220, respectively. It should be noted that the first and third stubs serve to reflect not only the first harmonic of the respective RF signal but also the third harmonic, fifth harmonic, etc. while the second and fourth stubs serve to reflect not only the second harmonic of the respective RF signal but also the fifth harmonic, eight harmonic, etc.

The antenna 100 and the rectifier 220 may be designed so that their impedances match that of the reflective structure formed by the first planar transmission line 210 and the four reflective stubs (i.e. about 50Ω). However, in cases where the impedances of the antenna 100 and the rectifier 220 are dictated by design constraints required to optimise the performance of these components, the dual-band RF-to-DC converter 200 may further be provided with an impedance-matching structure which ensures that substantially the same impedance ("substantially the same" meaning the same to within a tolerance such as 20%, 15%, 10%, 5% or 2%) is presented to the fundamental frequency component of each of the first and second RF signals, where this impedance is substantially the same as that of the rectifier 220 and preferably also substantially the same as that of the antenna 100. This impedance-matching structure comprises a shorted stub and a fifth stub connected to the first planar transmission line 210, as well as a capacitor that is connected to the first planar transmission line 210. The shorted stub, the first to fifth stubs and the capacitor are configured, and arranged along the first planar transmission line 210, such that the impedance of the first planar transmission line 210 where it connects to the rectifier 220 substantially matches the impedance of the rectifier 220 (in this embodiment, about 50Ω) for both of the fundamental frequencies of the first and second RF signals.

An example of how the shorted stub, the five stubs and the capacitor may be arranged along the first planar transmission line 210 will now be described in more detail with reference to FIG. 2.

For convenience, the first planar transmission line 210 can be considered to be formed of four portions, P1 to P4, of a continuous conductive trace in the form of a layer of copper, as shown in FIG. 2. The first portion, P1, is arranged to receive the first and second RF signals from the antenna 100, wherein the shorted stub, 211, and the fifth stub, 212, are connected to the first portion P1 and spaced apart from each other along the first planar transmission line 210. The shorted stub 211 is connected to the ground plane through a via 218 provided at its distal end. The second portion, P2, is connected to the first portion P1, wherein the first and second stubs (labelled 213 and 214, respectively) are connected to the second portion P2 and spaced apart from each other along the first planar transmission line 210. The third portion, P3, is connected to the second portion P2, wherein the capacitor, 215, is connected to the third portion P3 of the first planar transmission line 210. The fourth portion, P4, is located between the third portion P3 and the rectifier 220, wherein the third and fourth stubs (labelled 216 and 217, respectively) are connected to the fourth portion P4 and spaced apart from each other along the first planar transmission line 210. It will be appreciated that the shorted stub 211, the first to fourth stubs (213, 214, 216 and 217, respectively) and the capacitor 215 comprise respective conductive traces that merge with the conductive trace of the microstrip transmission line 210 to form a continuous layer of conductive material (i.e. copper in the present embodiment) on the top surface of the substrate.

The conductive trace of the capacitor 215 is shaped as part of a sector of a circle, the remaining part of the sector not forming the conductive trace of the capacitor 215 being an isosceles triangle having a vertex at the centre of the circle and sides extending along the straight sides of the sector. In the following, the length of each of the straight sides of the sector is referred to as the "radius" of the sector. The remaining side of the triangle defines an edge of the part of the sector that contacts the conductive trace in the third portion of the microstrip transmission line 210. The conductive trace of the capacitor 215 is arranged to be symmetrical about an axis that is perpendicular to the first planar transmission line 210, as shown in FIG. 2. In this connection, the shape of each of the shorted stub 211 and the first to fifth stubs 212-214, 216 and 217 is a rectangle in a plan view, with the longer sides of the rectangle being perpendicular to the transmission line 210.

Preferred dimensions of the portions of the transmission line 210, the shorted stub 211, the first to fifth stubs 212-214, 216 and 217, and the capacitor 215 have been determined by the inventors and are set out below.

The rectifier 220 may be any non-linear electrical component capable of rectifying the RF signals it receives via the first planar transmission line 210 to generate a DC signal. As a consequence of the rectifier's non-linearity, the signal output by the diode will contain RF signal components (including the fundamental frequency $f_0$ and harmonics $2f_0$, $3f_0$ and $4f_0$ etc.), as well as the rectified DC signal. For example, the rectifier 220 may be a diode. The rectifier may, as in the present embodiment, be provided in the form of a Schottky diode, for example an Agilent HSMS-2850 zero-bias Schottky diode. Zero-bias diodes have a relatively low barrier (high saturation current), resulting in a higher efficiency for low power input levels when compared to externally-biased detector diodes.

The DC signal, the fundamental component of each of the first and second RF signal, and harmonics of each of the first and second RF signals output by the rectifier 220, all pass to the second planar transmission line 230, which is arranged to receive these signals from the rectifier 220 and to reflect the harmonic(s) back towards the rectifier 220. In the second planar transmission line 230, each reflected harmonic will have a guided wavelength of $\lambda_g/n$, where n is an integer greater than or equal to 2.

As noted above, the output of the rectifier in a conventional RF-to-DC converter is passed to a filter which eliminates the harmonics by sending them to ground, resulting in their energy being lost. On the other hand, in embodiments of the present invention, the harmonics may be reflected back towards the rectifier 220 so that some of their power can be converted by the rectifier 220 to DC, further improving the efficiency of the RF-to-DC converter 200. Although the reflection of harmonics could be achieved using an arrangement of lumped components, the inventors have recognised that these would dissipate some of the incident power and has instead devised a more energy-efficient solution that employs an appropriately configured second planar transmission line 230, which does not require such lumped components.

As illustrated in FIG. 2, the second planar transmission line 230 comprises a rectangular conductive trace having two opposite sides that are longer than the two remaining opposite sides, where the longer sides extend from a first end of the transmission line 230 (connected to the rectifier 220) to the opposite, second end of the transmission line 230 along the wave-guiding direction, and the shorter sides are orthogonal to the wave-guiding direction of the transmission line 230. The width and length of the second planar transmission line 230 are selected to respectively provide impedance-matching and phase-matching of the RF signal components at the output of the rectifier 220. By appropriately choosing the width and length of the second planar transmission line 230, and appropriately configuring the coupling of the second planar transmission line 230 to ground via the coupling module 240, an 'open-circuit' can effectively be presented on the output of the rectifier 220 at the frequencies of the harmonics, so that the harmonics are reflected back towards the rectifier 220 during operation of the RF-to-DC converter 200.

Figure 3:
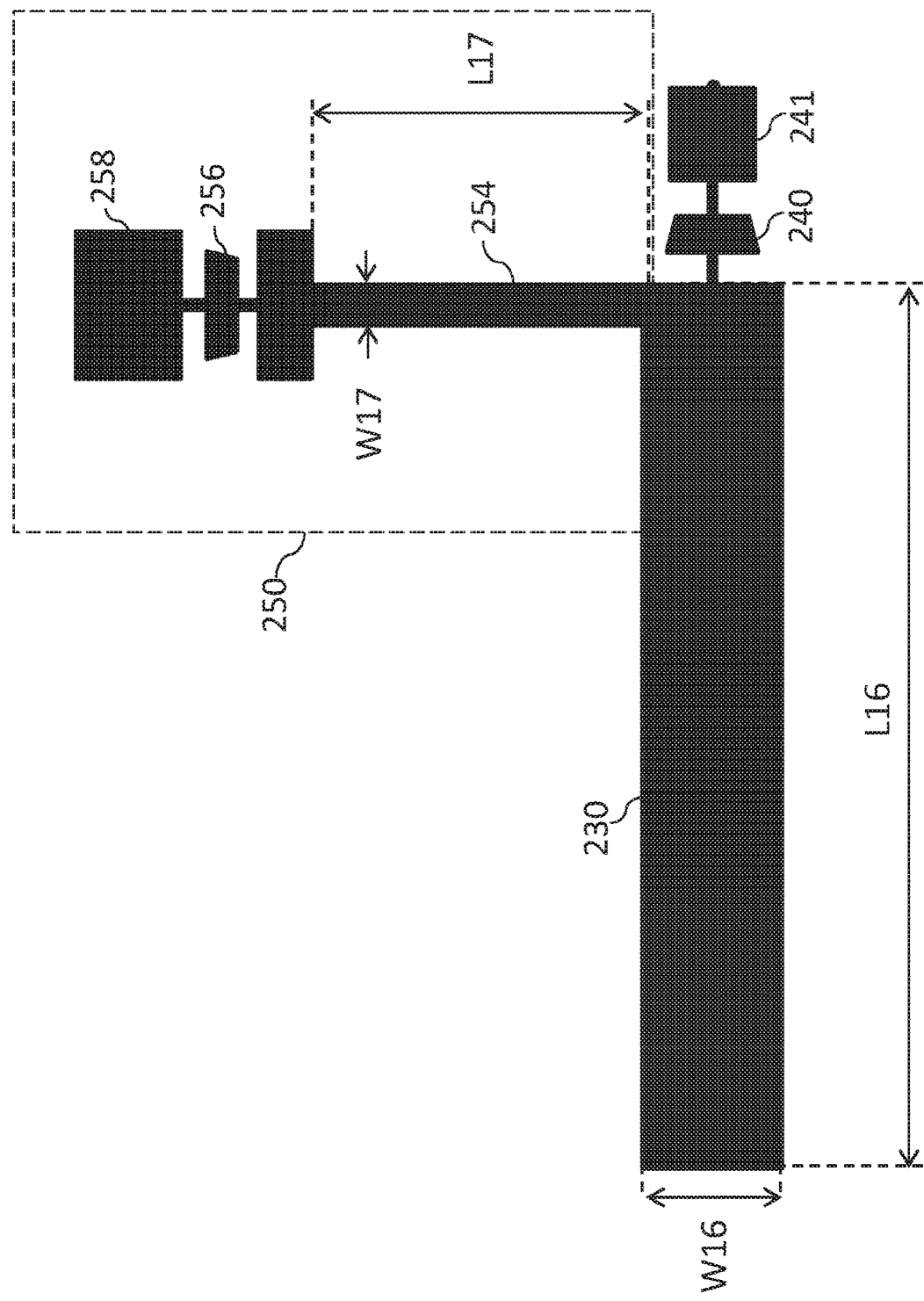
FIG. 3 is an enlarged view of the output filter 250 shown in FIG. 2.

A magnified plan view of the second planar transmission line 230, the coupling module 240 and the low-pass filter 250 is shown in FIG. 3. The coupling module 240 provides an example of how an appropriately sized second planar transmission line 230 can be configured to function as a reflector for the harmonics and, in the present embodiment, takes the simple form of a capacitor (which, by way of example, has a capacitance of 10 pF in the present embodiment) connected between the second end of the second planar transmission line 230 and ground, through a via 241. No components other than the aforementioned capacitor are required in the coupling module 240, which simplifies the design and eliminates losses.

The present inventors have recognised that when a load (such as a multimeter, a resistor, a power management module, a DC circuit module, etc.) is connected directly to the second end of the second planar transmission line 230, the RF input impedance of the RF-to-DC converter will change, and RF power will be dissipated through the load impedance (e.g. lost to ground somewhere in the load circuit), with the consequence that the conversion efficiency of the RF-to-DC converter is reduced. Further, the degradation of the power conversion efficiency would be a function of the RF input power and the impedance of the DC load.

As it is desirable for the RF-to-DC converter 200 to maintain high RF-to-DC conversion efficiency irrespective of the impedance of the DC load 300 to which it is connected, the RF components (the received signal and its harmonics) need to be greatly suppressed relative to the DC signal at the output of the converter 200, where it connects to the load 300. To address this problem, embodiments of the present invention may comprise a low-pass filter 250 for supplying the DC signal to the load 300, which enables the DC signal to be output by the converter 200 without wasting the energy in the RF component and without disturbing the reflection of the harmonics by the second transmission line 230. The low-pass filter 250 effectively 'isolates' the input RF impedance of the converter 200 from the impedance of the connected load 300, such that different loads (or a variable load) can be powered by the converter 200 without degrading the converter's power conversion efficiency.

As mentioned above, the low-pass filter 250 comprises an inductive component 256 and a third planar transmission line 254 that connects the second transmission line 230 to the inductive component 256. More specifically, in the present embodiment, the third planar transmission line 230 is a microstrip transmission line having a conductive trace that is rectangular in a plan view and has two opposite sides that are longer than the two remaining opposite sides of the rectangle, where the two longer sides extend from the second end of the second transmission line 230, in a direction perpendicular to the waveguiding direction of the second planar transmission line 230, as shown in FIG. 3. Thus, a first end of the third planar transmission line 254 is connected to the second end of the second planar transmission line 230, and a second end of the third planar transmission line 254 (opposite to the first end of the third planar transmission line 254) is connected to an end of the inductive element 256. The output pad 258 is connected to the remaining end of the inductive element 256 and provides a means of connecting the RF-to-DC converter 200 to the load 300. The third planar transmission line 254 and inductive component 256 are arranged to transmit the DC signal and to substantially block any RF signals which reach this stage of the converter, including a component of the received RF signals and the harmonics of the received RF signals.

The inductive element 256 may, for example, take the form of an inductor that is configured to exhibit a predetermined inductance. In the present embodiment, the inductive element 256 is a 10 µH inductor, although an inductor having an inductance greater than 10 µH may alternatively be used in the present embodiment. The impedance of an inductive component is provided by the following well-known relation:

$$X_L = 2\pi \cdot f \cdot l \quad (4)$$

where $X_L$ is the reactive component of the impedance, f is the frequency of a signal passing through the inductive component, and L is the inductance of the inductive component. Using Eqn. 4, the 10 µH inductor has an impedance of about 150 kΩ at 2.4 GHz, which is large enough for the present embodiment.

[Experimental Results]

The inventors have investigated the effects of varying various parameters characterising the RF-to-DC converter 200 described above on the converter's efficiency η, and have identified preferred ranges of these parameters as well as optimal values thereof that maximise the efficiency for RF signals at 1.84 GHz and 2.45 GHz when received at a power level of −20 dBm, as will now be described. In the following, preferred ranges and optimal values of the dimensions of the various components of the RF-to-DC converter 200 described above are expressed in terms of $\lambda_g$, which, according to Eqn. 2 above, is 65.88 mm when the frequency of the RF signal is 2.45 GHz and the relative permittivity of the substrate is 3.45. For convenience, expressions of these preferred ranges and values in millimetres are provided in parentheses.

Figure 4:
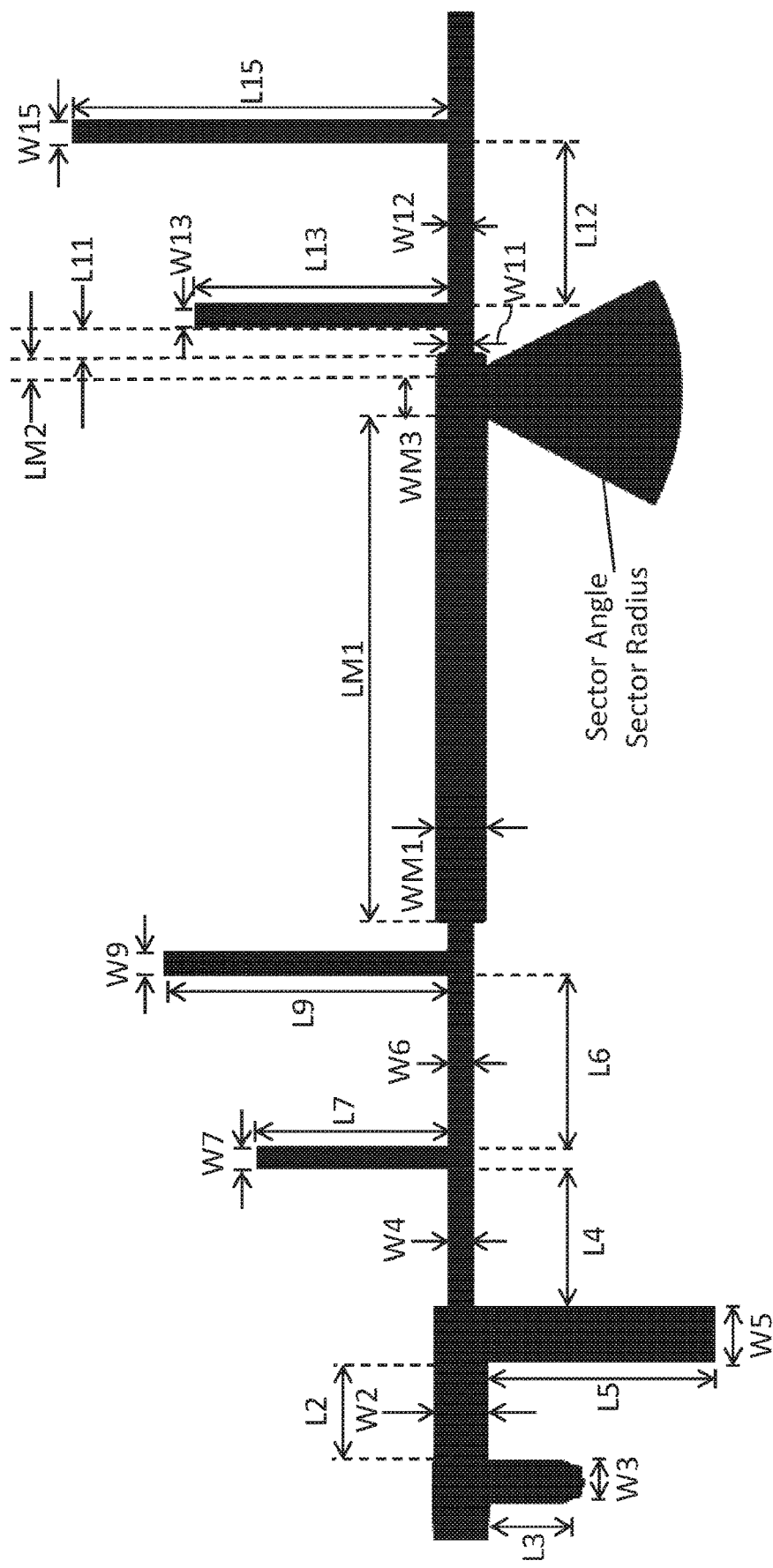
FIG. 4 is a schematic showing various dimensional parameters associated with components provided in portions P1 to P4 of the RF-to-DC converter of the embodiment.

Turning firstly to the configuration of the first planar transmission line 210 and of the stubs 212 to 214, 216, 217, the shorted stub 211 and the capacitor 215 illustrated in FIG. 2, the inventors have determined preferred ranges and optimal values of the dimensions of these components, which are shown in FIG. 4.

The first stub 213 has a length L9 chosen such that first stub 213 reflects the first harmonic of the aforementioned first signal that has a fundamental frequency of about 2.45 GHz. The first stub 213 is expected to function as a reflector when the following condition is satisfied:

$$k_g \cdot L9 = \frac{\pi}{2} \quad (5)$$

where $k_g = 2\pi/\lambda_g$. In the embodiment, this gives a value for L9 of 8.2 mm. The values of the lengths of the remaining stubs (i.e. the values of L7, L13 and L15) were calculated in a similar way. Taking these values of L7, L9, L13 and L15 as starting points, the $S_{21}$ transmission coefficient response of the first planar transmission line 210 with stubs 213, 214, 216 and 217 in place was assessed using simulation software, in order to determine preferred values of L7, L9, L13 and L15.

In this way, it was determined that L9 is preferably between $0.146\lambda_g$ and $0.152\lambda_g$ (i.e. between 9.65 mm and 10.03 mm), and is more preferably $0.149\lambda_g$ (i.e. 9.82 mm).

Similarly, the lengths of the second stub 214, the third stub 216 and the fourth stub 217 (L7, L15 and L13, respectively), were chosen to reflect, respectively, the second harmonic of the WiFi band identified above, and the first harmonic and second harmonic of the GSM band identified above. It was determined that L7 is preferably between $0.098\lambda_g$ and $0.100\lambda_g$ (i.e. between 6.47 mm and 6.73 mm), and is more preferably $0.10\lambda_g$ (i.e. 6.59 mm). It was further determined that L13 is preferably between $0.130\lambda_g$ and $0.135\lambda_g$ (i.e. between 8.54 mm and 8.90 mm), and is more preferably $0.133\lambda_g$ (i.e. 8.73 mm). It was further determined that L15 is preferably between $0.193\lambda_g$ and $0.201\lambda_g$ (i.e. between 12.72 mm and 13.25 mm), and is more preferably $0.197\lambda_g$ (i.e. 13 mm).

Preferred ranges and optimum values of the dimensions of the converter components relating to the impedance-matching structures in portions P1 and P3 shown in FIG. 2 where next determined with the aim of achieving a 50Ω impedance for RF signals at both 2.45 GHz and 1.84 GHz. The main parameters for this optimisation were WM1, the radius of the capacitor, the sector angle of the capacitor, WM3, LM1 and LM2.

For each of the parameters shown in FIG. 4 other than the lengths of the stubs 213, 214, 216 and 217, preferred ranges of the parameter were determined by investigating how the frequency response of the $S_{11}$ reflection coefficient of the first planar transmission line 210 changes with the parameter value. In these investigations, for the first frequency band (i.e. the 2.45 GHz WiFi band identified above), parameter values yielding respective $S_{11}$ frequency response curves having at least one value below −5 dB in the first frequency band were selected and used to define a first range of the parameter. Similarly, for the second frequency band (i.e. the GSM band identified above), parameter values yielding respective $S_{11}$ frequency response curves having at least one value below −5 dB in the second frequency band were selected and used to define a second range of the parameter. The preferred range of the parameter is defined by the overlap of the first and second ranges of the parameter.

Figure 5A:
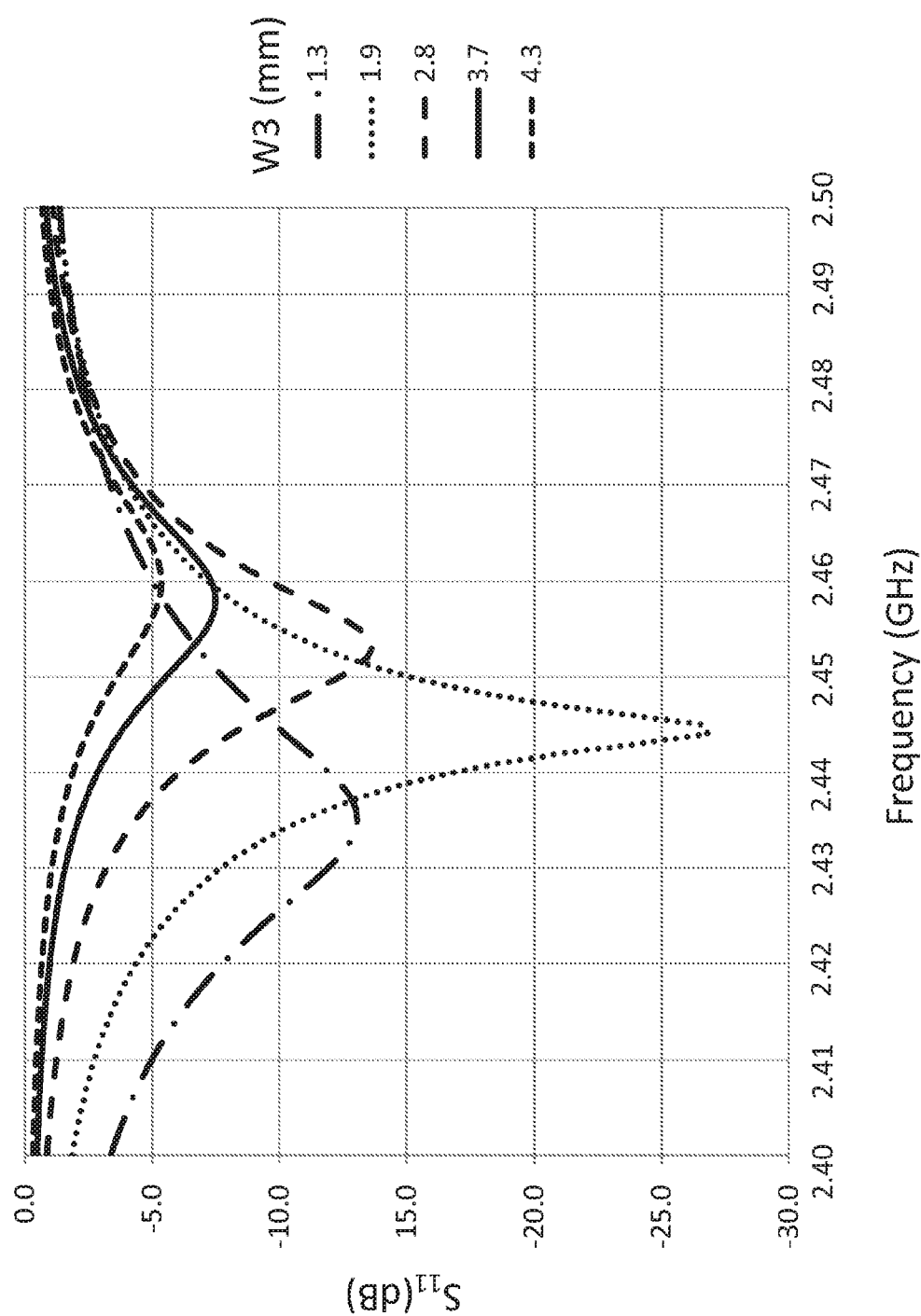
FIGS. 5A and 5B show S11 frequency response curves measured over the first and second frequency bands, respectively, for a number of different values of the width W3 shown in FIG. 4.
Figure 5B:
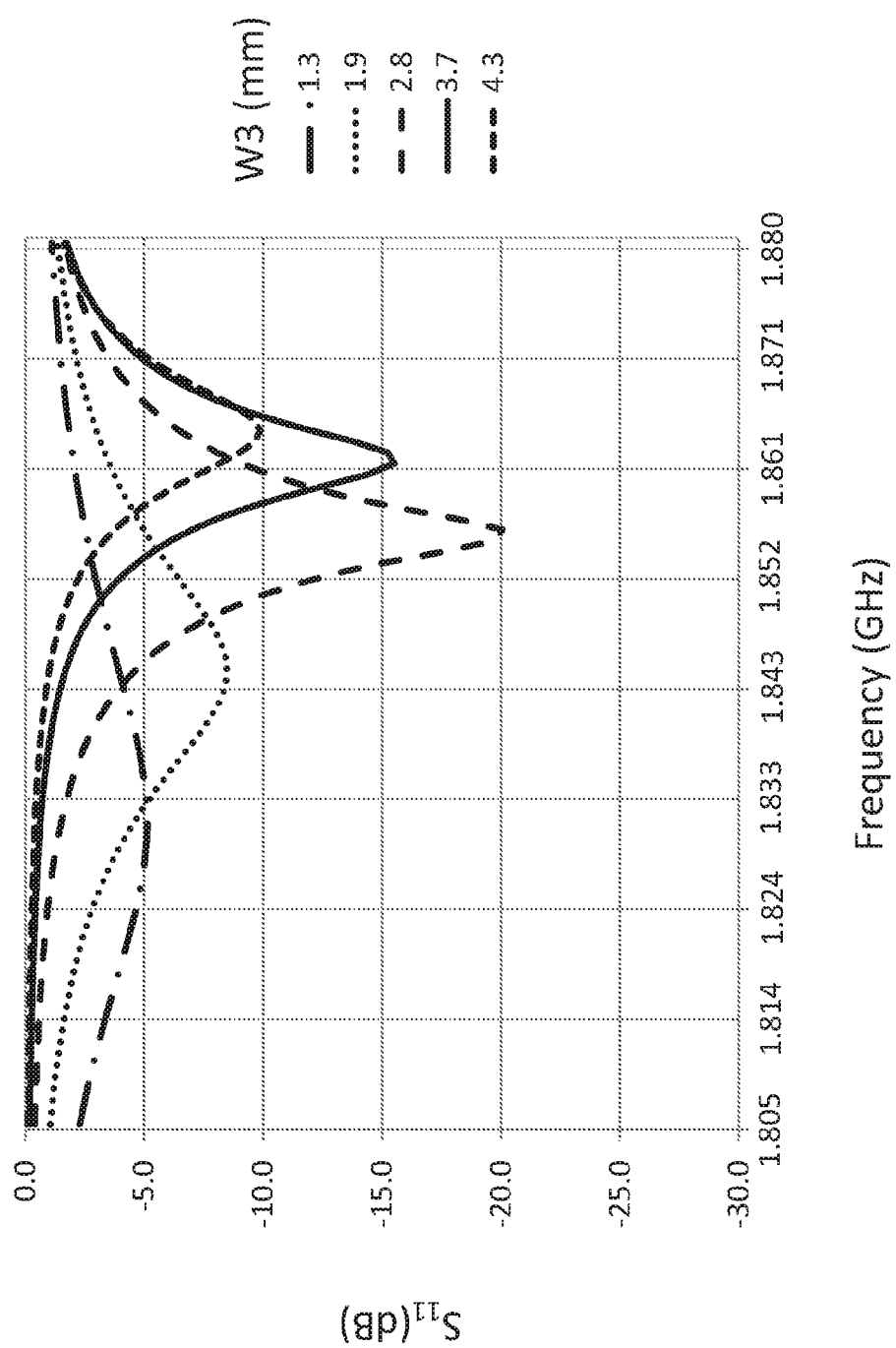

As an example, FIGS. 5A and 5B respectively show $S_{11}$ frequency response curves over the first and second frequency bands for a number of different values of the width W3 shown in FIG. 4. In these figures, the value of W3 is varied from 1.3 mm to 4.3 mm, which is within the preferred range of the width W3. Curves obtained for values of W3 outside this preferred range are not shown in FIGS. 5A and 5B. By examining the curves obtained using various values of W3, the preferred range for W3 was found to be from $0.020\lambda_g$ and $0.065\lambda_g$ (i.e. between 1.3 mm and 4.3 mm), and more preferably $0.022\lambda_g$ (1.43 mm).

Preferred values of the remaining parameters shown in FIG. 4 (other than the lengths of the stubs discussed above) were obtained in a similar manner to W3, and the preferred ranges and optimal values of these parameters are shown in Table 1 below.

TABLE 1

| Parameter | Preferred Value (/mm) | | | Preferred Value (/$\lambda_g$) | | |
|---|---|---|---|---|---|---|
| | Minimum | More preferred | Maximum | Minimum | More preferred | Maximum |
| L3 | 1.3 | 2.0 | 3.4 | 0.020 | 0.030 | 0.052 |
| W2 | 0.7 | 1.7 | 3.3 | 0.0106 | 0.026 | 0.050 |
| L2 | 1.6 | 2.8 | 4.0 | 0.024 | 0.043 | 0.061 |
| W5 | 0.3 | 2.0 | 3.0 | 0.0046 | 0.031 | 0.046 |
| L5 | 1.0 | 7.7 | 10.6 | 0.0152 | 0.117 | 0.161 |
| W4 | 0.5 | 0.75 | 1.4 | 0.0076 | 0.011 | 0.021 |
| L4 | 2.0 | 4.8 | 6.0 | 0.030 | 0.073 | 0.091 |
| W7 | 0.5 | 0.75 | 1.1 | 0.0076 | 0.011 | 0.017 |
| W6 | 0.5 | 0.75 | 1.4 | 0.0076 | 0.011 | 0.021 |
| L6 | 2.0 | 5.9 | 8.6 | 0.030 | 0.090 | 0.131 |
| W9 | 0.5 | 0.75 | 1.1 | 0.0076 | 0.011 | 0.017 |
| WM1 | 1.3 | 1.6 | 3.7 | 0.020 | 0.025 | 0.056 |
| LM1 | 14.0 | 14.7 | 19.2 | 0.213 | 0.223 | 0.291 |
| WM3 | 1.0 | 1.5 | 2.8 | 0.015 | 0.023 | 0.043 |
| Sector Angle | 42.0 | 58.1 | 85.0 | (Angle values are given in degrees) | | |
| Sector Radius | 5.8 | 6.8 | 7.0 | 0.088 | 0.103 | 0.106 |
| LM2 | 0.2 | 0.51 | 2.0 | 0.003 | 0.008 | 0.030 |

TABLE 1-continued

| Parameter | Preferred Value (/mm) | | | Preferred Value (/$\lambda_g$) | | |
|---|---|---|---|---|---|---|
| | Minimum | More preferred | Maximum | Minimum | More preferred | Maximum |
| W11 | 0.5 | 0.75 | 5.9 | 0.0076 | 0.011 | 0.090 |
| L11 | 0.3 | 1.0 | 2.1 | 0.0046 | 0.015 | 0.032 |
| W13 | 0.5 | 0.75 | 2.3 | 0.0076 | 0.011 | 0.035 |
| W12 | 0.5 | 0.75 | 1.1 | 0.0076 | 0.011 | 0.017 |
| L12 | 4.4 | 5.6 | 6.5 | 0.067 | 0.084 | 0.099 |
| W15 | 0.5 | 0.75 | 1.1 | 0.0076 | 0.011 | 0.017 |

Further investigations were undertaken to determine preferred dimensions of the second planar transmission line 230.

Figure 6:
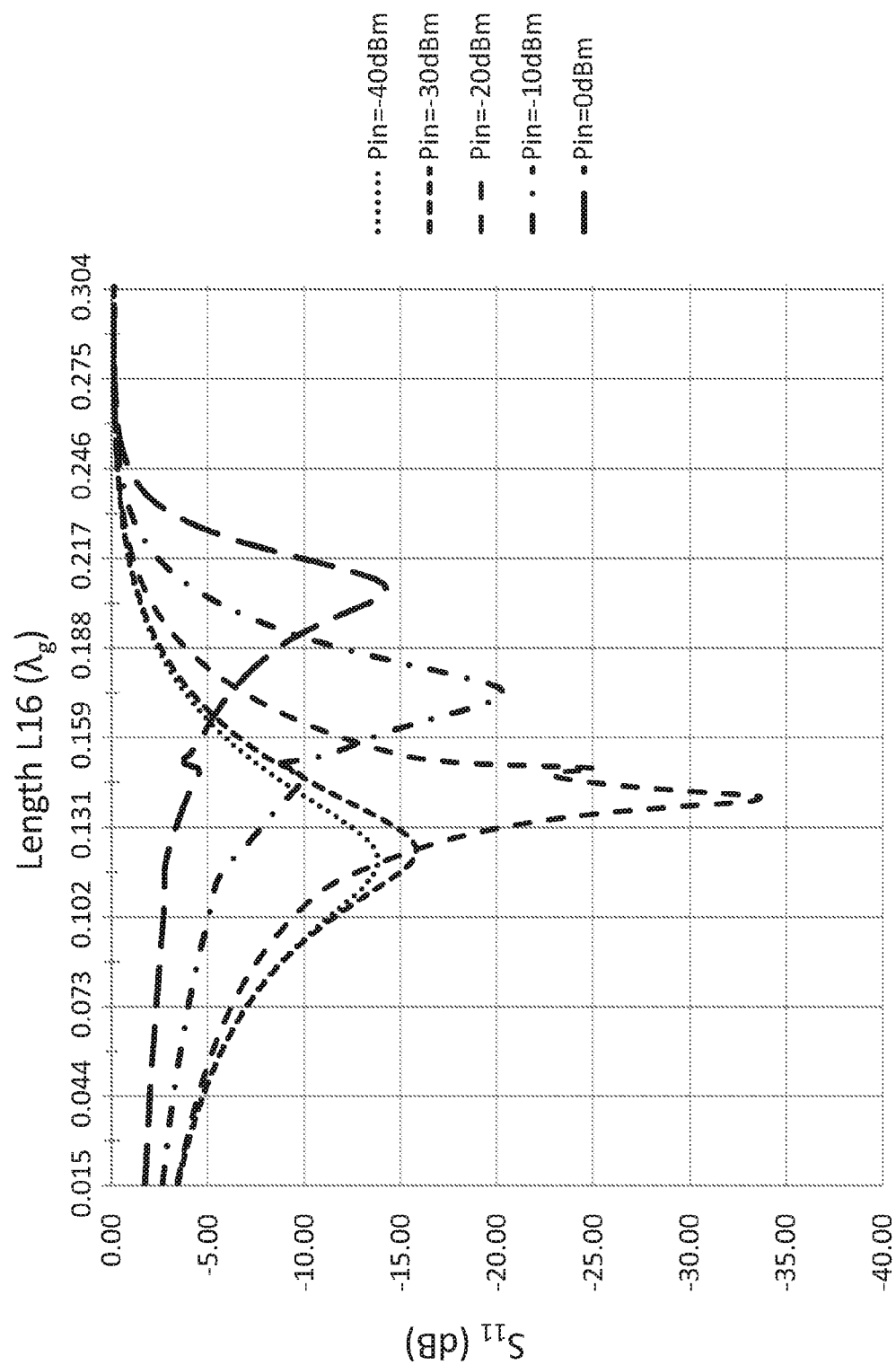
FIG. 6 illustrates how the reflection coefficient $S_{11}$ varies as a function of the length of second planar transmission line 230 in an embodiment.

To determine a preferred range for the length L16 of the second planar transmission line 230, the reflection coefficient $S_{11}$ was measured at the input to the RF-to-DC converter 200. FIG. 6 illustrates how the reflection coefficient $S_{11}$ varies as a function of the length L16 of second planar transmission line 230 (expressed in terms of $\lambda_g$) for five different values of the input RF power (from −40 dBm to zero dBm). The frequency of the signal is 2.45 GHz. As shown in FIG. 6, $S_{11}$ was found to be below −5 dB when the length L16 of the second planar transmission line 230 is in the preferred range between $0.049\lambda_g$ and $0.225\lambda_g$ (i.e. between 3.2 mm and 14.8 mm).

Figure 7:
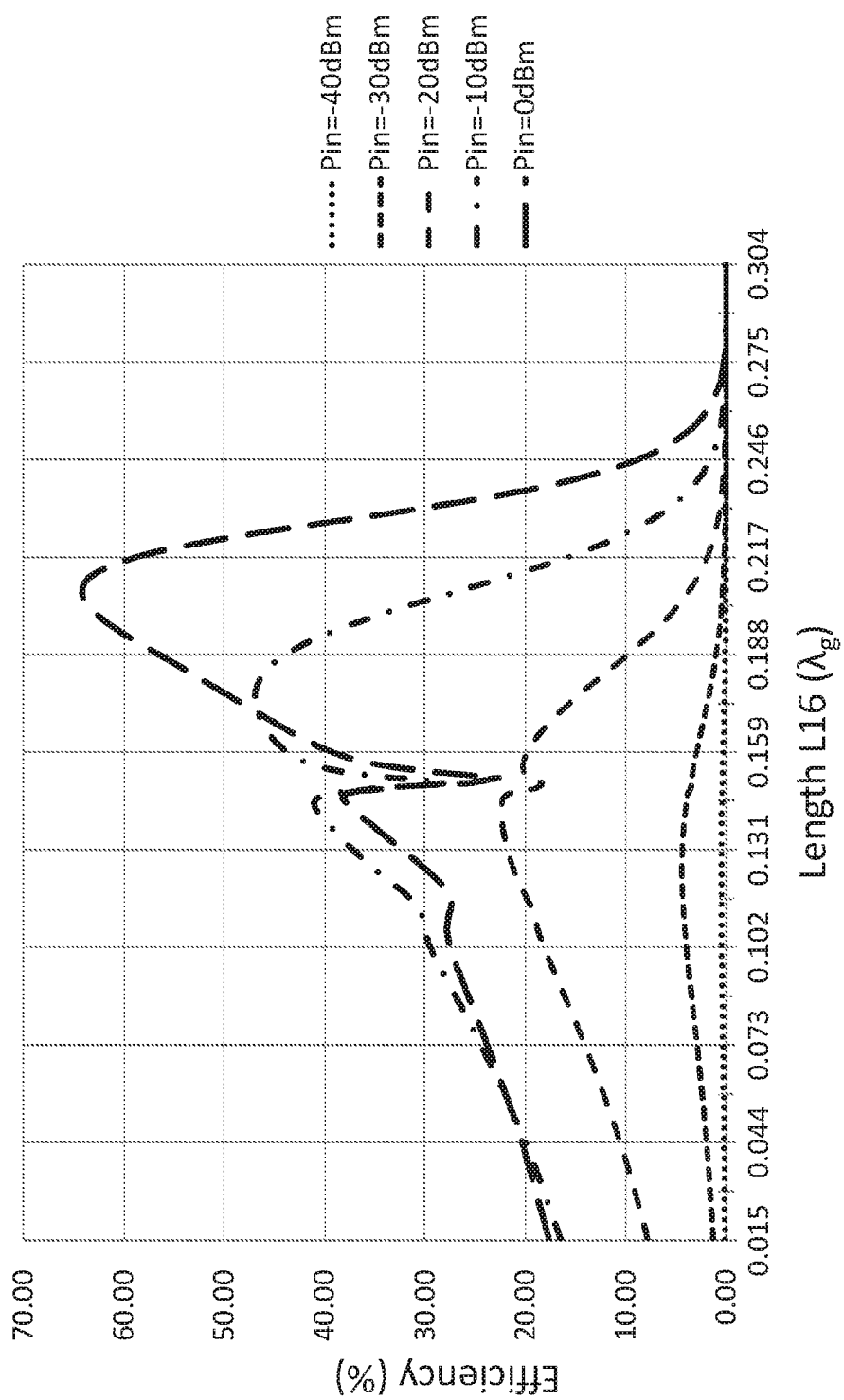
FIG. 7 illustrates how the RF-to-DC conversion efficiency of converter of the embodiment varies as a function of the length of second planar transmission line 230.

FIG. 7 illustrates how the RF-to-DC conversion efficiency of converter 200 varies as a function of the length of second planar transmission line 230 (along the waveguiding direction) for an input RF signal of frequency 2.45 GHz and power level from −40 dBm to zero dBm. As illustrated in FIG. 7, for an input power level of −20 dBm, the conversion efficiency is highest when the second planar transmission line 230 has a length L16 of $0.139\lambda_g$ (9.2 mm).

Figure 8:
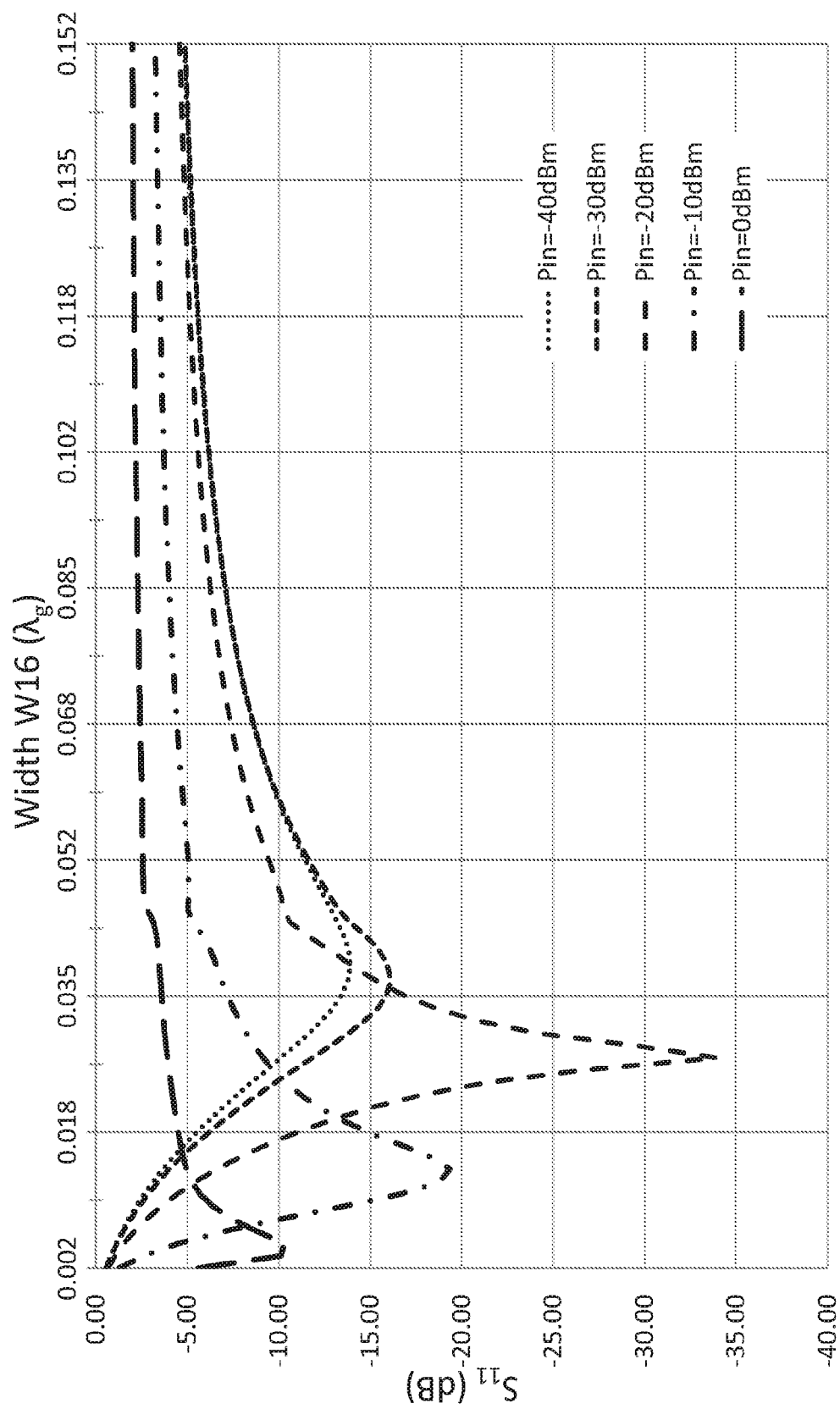
FIG. 8 shows how the reflection coefficient S11 varies as a function of the width of second planar transmission line 230 in an embodiment.

In the same way as previously described for the length of second planar transmission line 230, a preferred range and more preferred value of the width W16 of second planar transmission line 230 were determined. FIG. 8 shows how the reflection coefficient $S_{11}$ varies as a function of the width W16 of second planar transmission line 230 (expressed in terms of $\lambda_g$) for five different values of the input RF power (from −40 dBm to zero dBm). The frequency of the signal is again 2.45 GHz. As shown in FIG. 8, $S_{11}$ was found to have values below −5 dB when the width W16 of the second planar transmission line 230 is in the preferred range between $0.0020\lambda_g$ and $0.140\lambda_g$ (i.e. between 0.1 mm and 9.5 mm).

Figure 9:
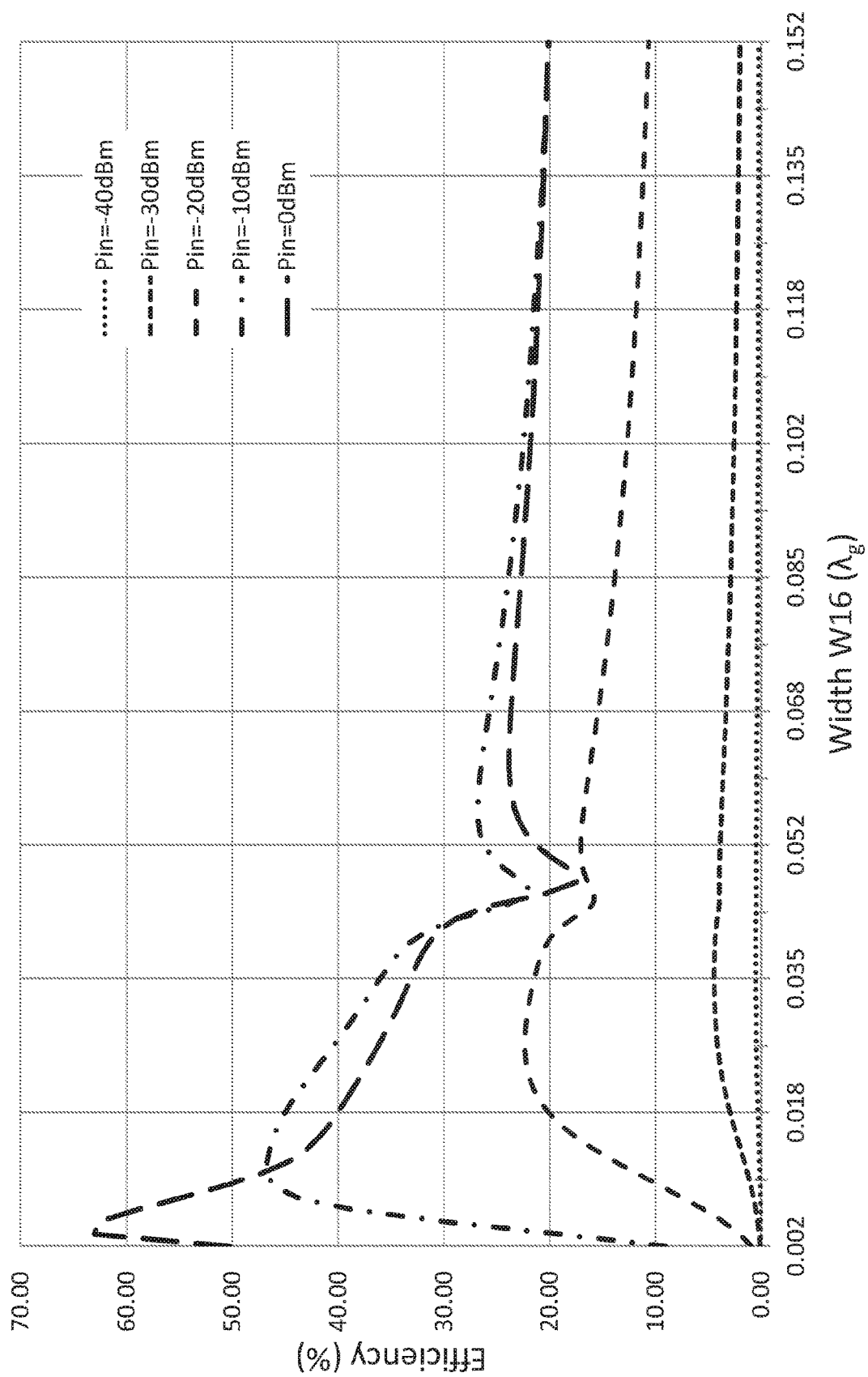
FIG. 9 illustrates how the RF-to-DC conversion efficiency of converter of the embodiment varies as a function of the width of second planar transmission line 230.

FIG. 9 illustrates how the RF-to-DC conversion efficiency of converter 200 varies as a function of the width W16 of second planar transmission line 230 for an input RF signal of frequency 2.45 GHz and power level from −40 dBm to zero dBm. As illustrated in FIG. 9, for an input power level of −20 dBm, the conversion efficiency is highest when the second planar transmission line 230 has a width W16 of $0.027\lambda_g$ (1.8 mm).

Further investigations were undertaken to determine preferred dimensions of the third planar transmission line 254.

Figure 10:
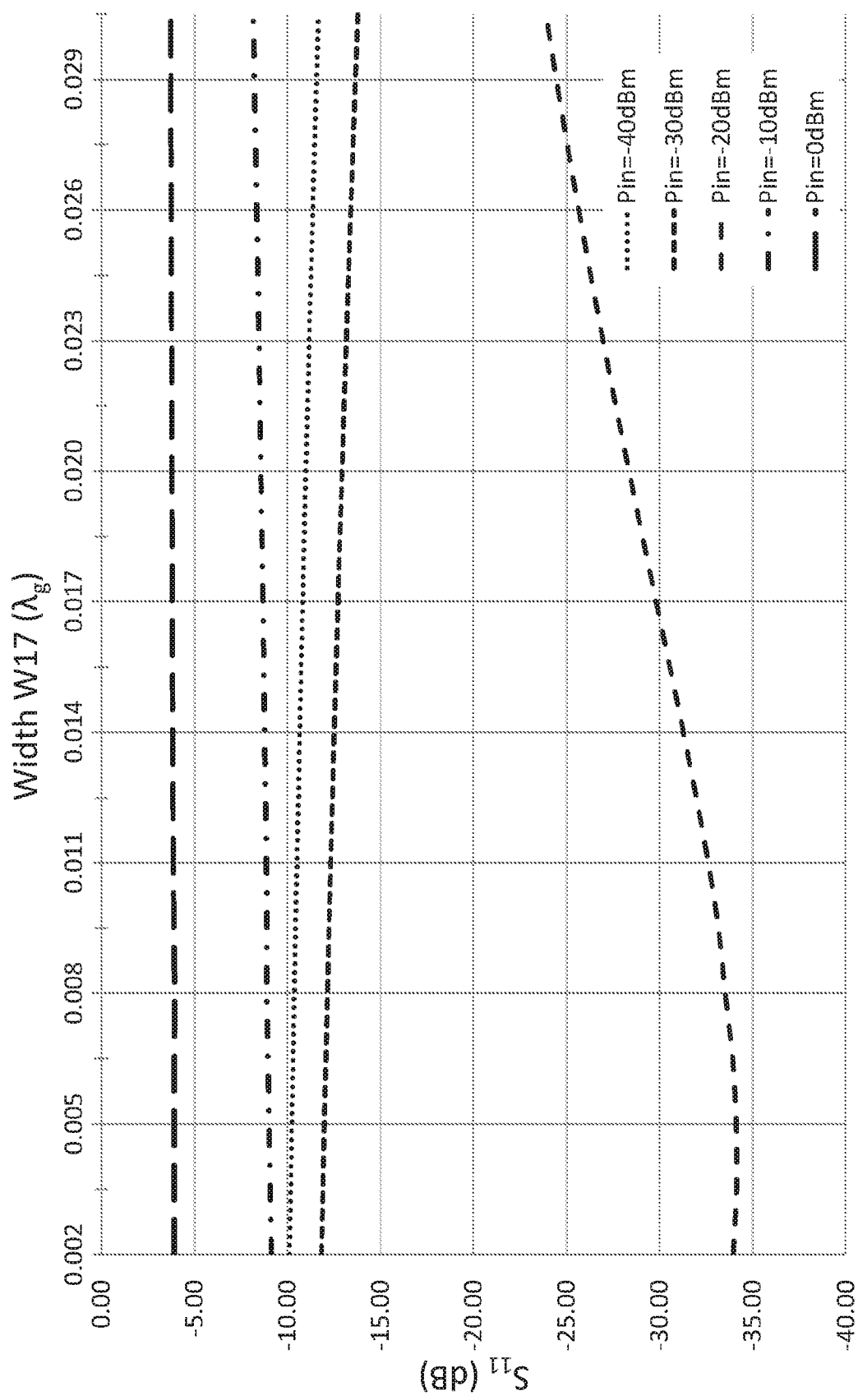
FIG. 10 illustrates the dependence of the reflection coefficient S11 on the width of third planar transmission line 254 in an embodiment.

The inventors have found that the RF-to-DC conversion efficiency is only a weak function of the width W17 of third planar transmission line 254. The effects of varying the width W17 of the third planar transmission line were, however, found to be more clearly manifested in the reflection coefficient $S_{11}$, which was therefore studied as a function of this width to determine a preferred range thereof. FIG. 10 illustrates the dependence of the reflection coefficient $S_{11}$ on the width W17 of third planar transmission line 254 for an RF signal frequency of 2.4 GHz. As shown in FIG. 9, for an input power of −20 dBm, the reflection of RF components by the third planar transmission line 254 is optimised when the width of the third planar transmission line 254 is between $0.002\lambda_g$ and $0.005\lambda_g$ (i.e. between 0.1 mm and 0.3 mm).

The length of third planar transmission line 254, L17, was found to have little effect on the performance of the low-pass filter 250, and was chosen to have a value of 3 mm in the embodiment. The line impedance of third planar transmission line 254 is about 110Ω at 2.4 GHz.

To demonstrate the effectiveness of the low-pass filter 250 in suppressing harmonics in the output of the RF-to-DC converter 200, the spectral content of the output of the converter having such low-pass filter was compared with that of a converter to which a load 300 was connected directly to the second planar transmission line 230.

Figure 11:
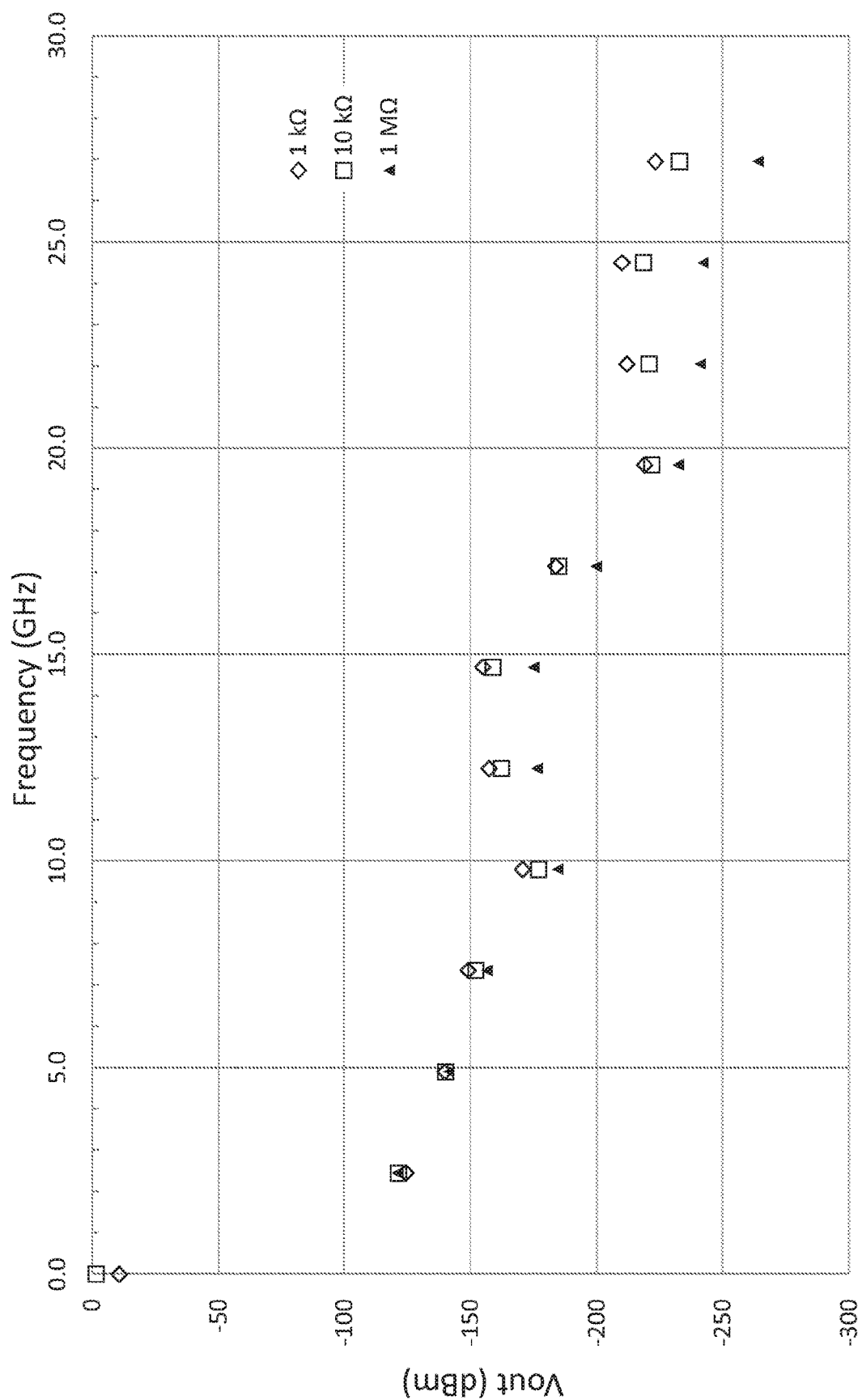
FIG. 11 shows the frequency spectrum of the output voltage of the RF-to-DC converter of the embodiment having the low-pass filter 250, where an RF signal at 2.4 GHz is fed to the converter's input at a power level of −15 dBm.

FIG. 11 shows the frequency spectrum of the output voltage of the RF-to-DC converter 200 of the embodiment having the low-pass filter 250, where an RF signal at 2.4 GHz is fed to the converter's input at a power level of −15 dBm. Three spectra are shown in FIG. 11, each having been determined for a different load 300. In these experiments, the load 300 was modelled as a parallel combination of a 10 pF capacitor and a resistor having a resistance of 1 kΩ, 10 kΩ or 1 MΩ. The points in the spectra of FIG. 11 correspond to the DC signal, the fundamental component of the RF signal, and several harmonics at higher frequencies. As shown in FIG. 11, the amplitudes of the fundamental component and of all the harmonics are greatly suppressed in relation to the DC output. Moreover, all of the RF signal amplitudes are well below −100 dBm (i.e. 0.1 pW) and, as such, can be considered negligible. The load 300 thus effectively receives only the DC component from the output of the converter 200. The input impedance of the load therefore has little influence on the input RF impedance and consequently little influence on the RF-to-DC performance of the converter 200.

The low-pass filter 250 thus allows the converter 200 to supply more DC power to the load 300 whilst operating at a high RF-to-DC conversion efficiency. In summary, the low-pass filter 250 functions to isolate and extract DC power efficiently from a mix of DC and RF signals in the converter 200 without disturbing the reflection of the RF signals by the second planar transmission line 230.

Figure 12:
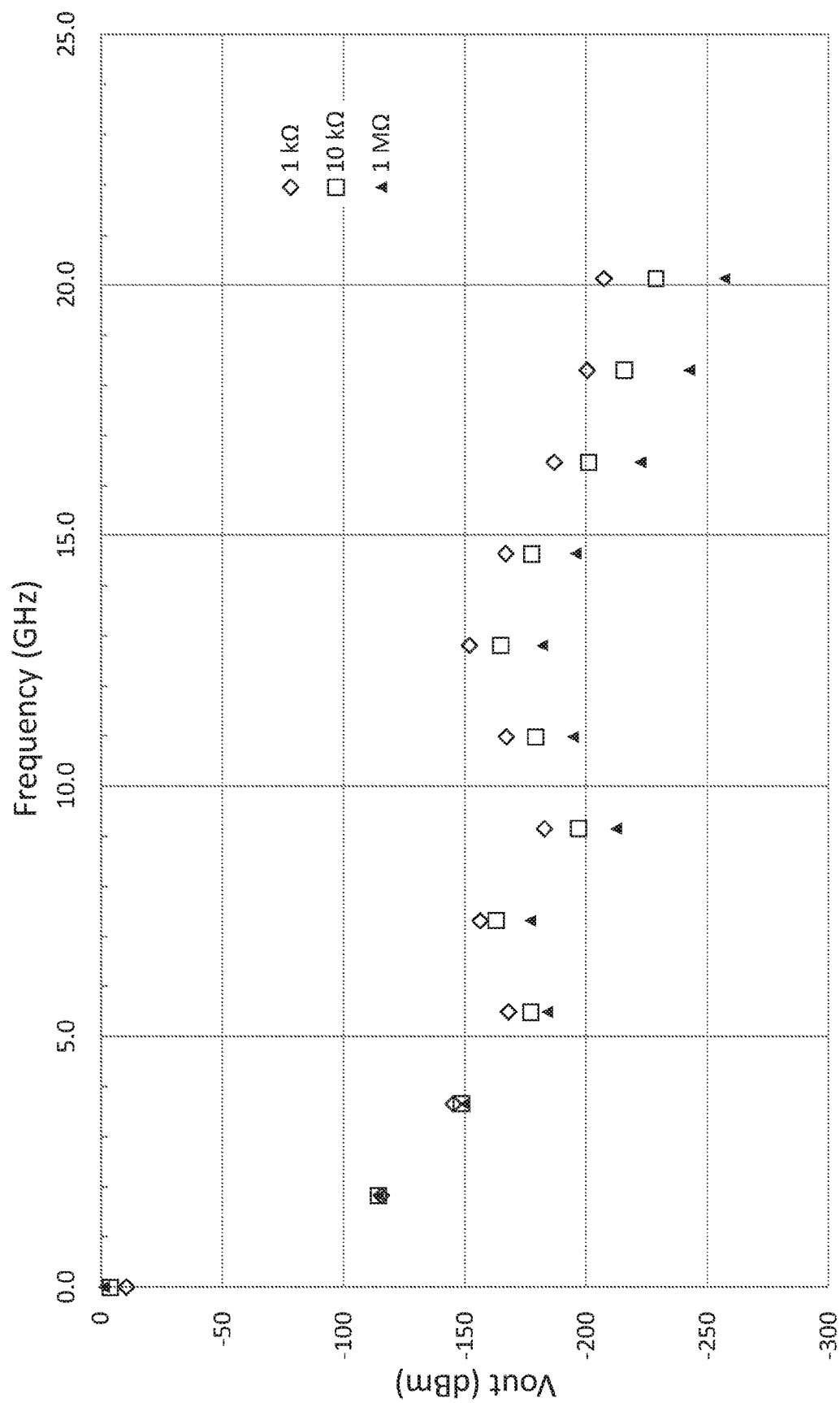
FIG. 12 shows the frequency spectrum of the output voltage of the RF-to-DC converter of the embodiment having the low-pass filter 250, where an RF signal at 1.8 GHz is fed to the converter's input, at a power level of −15 dBm.

FIG. 12 shows the frequency spectrum of the output voltage of the RF-to-DC converter 200 of the embodiment having the low-pass filter 250, where an RF signal at 1.8 GHz is fed to the converter's input at a power level of −15 dBm. As in FIG. 11, three spectra are shown, each having been determined for a different load 300. In these experiments, the load 300 was also modelled as a parallel combination of a 10 pF capacitor and a resistor having a resistance of 1 kΩ, 10 kΩ or 1 MΩ. The points in the spectra of FIG. 12 correspond to the DC signal, the fundamental component of the RF signal, and several harmonics at higher frequencies. As shown in FIG. 12, the RF components of the output are also suppressed by at least ten orders of magnitude in the GSM frequency band mentioned above.

Figure 13:
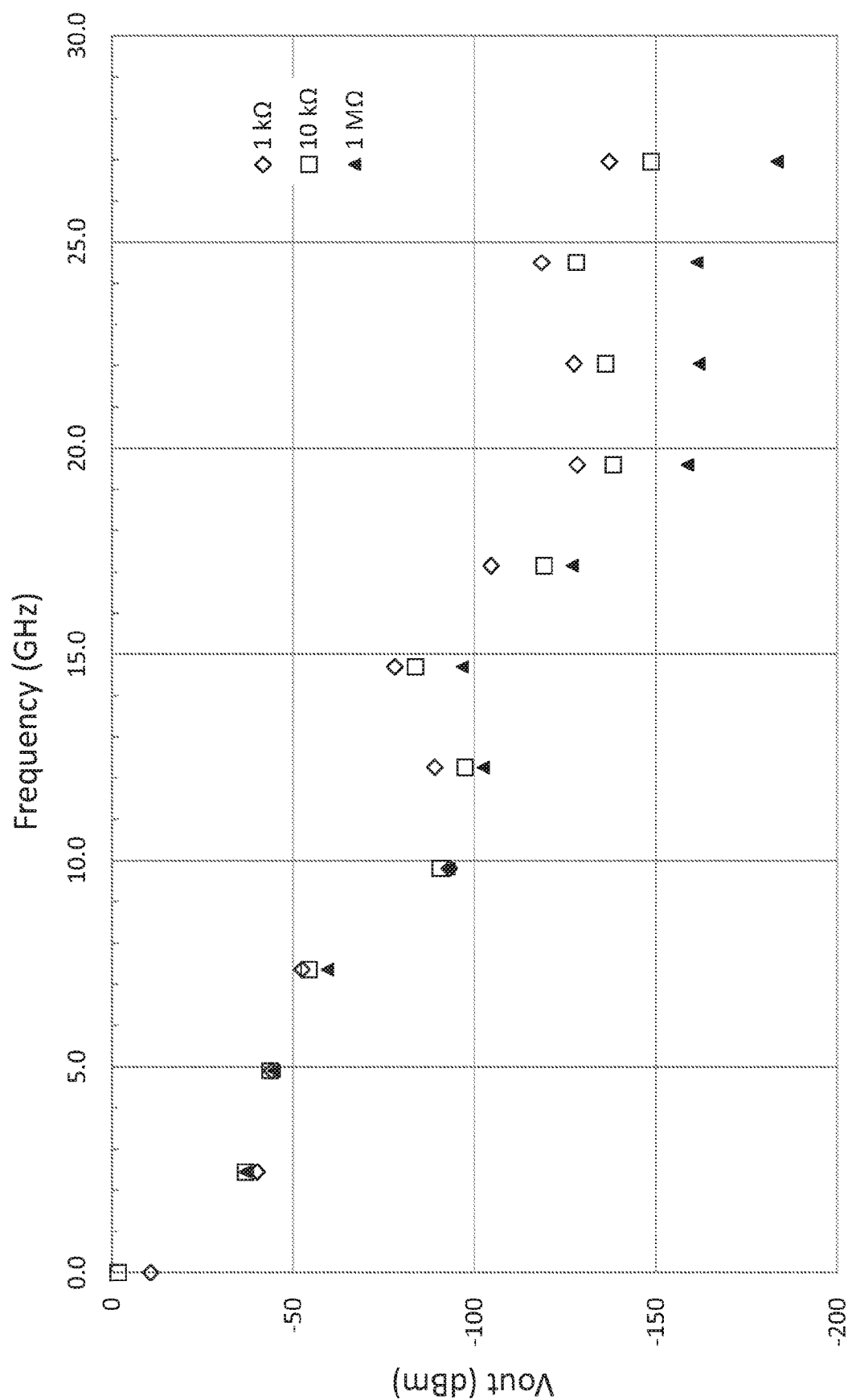
FIG. 13 shows the frequency spectrum of the output voltage of an RF-to-DC converter not having the low-pass filter 250, where an RF signal at 2.4 GHz is fed to the converter's input at a power level of −15 dBm.
Figure 14:
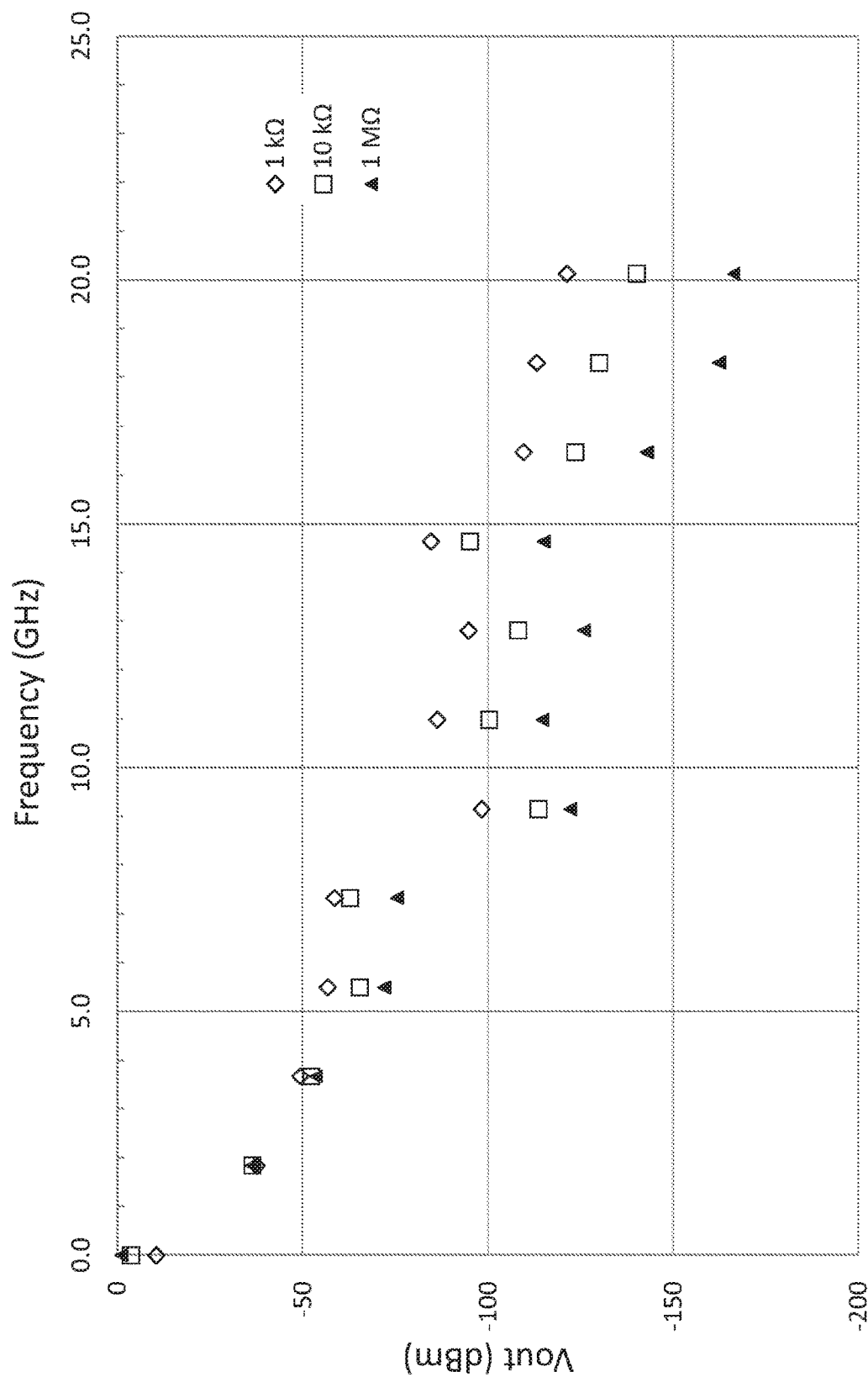
FIG. 14 shows similar results to FIG. 13, observed in the case where an RF signal at 1.8 GHz (rather than 2.4 GHz) is fed to the converter's input.

For comparison, FIG. 13 shows the frequency spectrum of the output voltage of an RF-to-DC converter not having the low-pass filter 250, where an RF signal at 2.4 GHz is fed to the converter's input at a power level of −15 dBm. In this case, the fundamental component of the RF signal, as well as the first and second harmonics, have measurable amplitudes in the −40 dBm to −50 dBm range for each of the load values. Only components below −100 dBm can be considered negligible in this context, and each of the first to fifth harmonics has an output power higher than this threshold. There is therefore a significant amount of RF power at the output stage of this alternative converter, which will degrade the RF-to-DC conversion efficiency. The same observation can be made in the case where an RF signal at 1.8 GHz (rather than 2.4 GHz) is fed to the converter's input, as shown in the similar results in FIG. 14.

The low-pass filter 250 thus enables effective isolation and extraction of DC power from the converter 200, without significant wastage of RF power. A converter with the low-pass filter 250 therefore has stable efficiency and is able to deliver the maximum available DC power to a DC load without affecting the input impedance (and efficiency) of the converter.

As noted above, aspects of the disclosure provide a dual-band converter operable to convert a first radio frequency signal in a first frequency band and a second radio frequency signal in a second frequency band that is separate from the first frequency band into a DC signal for powering a load, the converter comprising:

a rectifier arranged to generate, based on the first and second radio frequency signals, the DC signal and two or more harmonics of each of the first and second radio frequency signals during operation of the dual-band converter;

a planar transmission line arranged to guide the first and second radio frequency signals to the rectifier and to receive a component of each of the harmonics generated by the rectifier during operation of the dual-band converter;

a first stub and a second stub each connected to the planar transmission line to reflect, during operation of the dual-band converter, a component of a first harmonic and a component of a second harmonic of the first radio frequency signal received from the rectifier, respectively; and a third stub and a fourth stub each connected to the planar transmission line and arranged to reflect, during operation of the dual-band converter, a component of a first harmonic and a component of a second harmonic of the second radio frequency signal received from the rectifier, respectively.

It will however be appreciated by the skilled addressee in the context of the present disclosure that the stubs may be replaced by any components which provide equivalent function.

The first stub and the second stub are just one example of a filter which provides a contribution to the impedance of the planar transmission line. This contribution to the impedance causes reflection of the component of the first harmonic and the component of the second harmonic of the first radio frequency signal received from the rectifier. This may be achieved by any appropriate electronic components which provide two spatially separate transitions in impedance spaced apart along the transmission line. It will therefore be understood, in the context of the present disclosure, that a first reactive impedance may be connected planar transmission line at a first location, and a second reactive impedance connected to the planar transmission line at a second location to provide this series of transitions in impedance.

For example, the first stub mentioned above may provide the first reactive impedance connected to the planar transmission line at the first location. In addition, or as an alternative, the second stub mentioned above may be connected to the planar transmission line at the second location.

These two reactive impedances may each comprise one or more capacitive and/or inductive components connected in parallel and/or series between the transmission line and a reference potential (such as ground or virtual ground).

Likewise, in addition, or as a further alternative it will also be appreciated that the stubs may be replaced by any components which provide equivalent function. The third stub and the fourth stub too are also just an example of a filter which provides a contribution to the impedance of the planar transmission line. This contribution to the impedance causes reflection of the component of the first harmonic and the component of the second harmonic of the second radio frequency signal received from the rectifier.

As noted above, this too may be achieved by any appropriate electronic components which provide two spatially separate transitions in impedance spaced apart along the transmission line. As also noted, this too may be achieved by a third reactive impedance connected to the planar transmission line at a third location, and a fourth reactive impedance connected to the planar transmission line at a fourth location to provide this series of transitions in impedance.

It will thus be understood that the third stub mentioned above may provide the third reactive impedance connected to the planar transmission line at the third location. In addition, or as an alternative, the fourth stub mentioned above may be connected to the planar transmission line at the fourth location. These two reactive impedances may each comprise one or more capacitive and/or it components connected in parallel and/or series between the transmission line and a reference potential (such as ground or virtual ground).

The invention claimed is:

1. A dual-band converter operable to convert a first radio frequency signal in a first frequency band and a second radio frequency signal in a second frequency band that is separate from the first frequency band into a DC signal for powering a load, the converter comprising:
    a rectifier arranged to generate, based on the first and second radio frequency signals, the DC signal and two or more harmonics of each of the first and second radio frequency signals during operation of the dual-band converter;
    a planar transmission line arranged to guide the first and second radio frequency signals to the rectifier and to receive a component of each of the harmonics generated by the rectifier during operation of the dual-band converter;
    a first stub and a second stub each connected to the planar transmission line and arranged to reflect, during operation of the dual-band converter, a component of a first harmonic and a component of a second harmonic of the first radio frequency signal received from the rectifier, respectively; and
    a third stub and a fourth stub each connected to the planar transmission line and arranged to reflect, during operation of the dual-band converter, a component of a first harmonic and a component of a second harmonic of the second radio frequency signal received from the rectifier, respectively.

2. A dual-band converter according to claim 1, further comprising:
    a shorted stub and a fifth stub connected to the planar transmission line; and
    a capacitor connected to the planar transmission line, wherein the shorted stub, the first to fifth stubs and the capacitor are configured, and arranged along the planar transmission line, such that the impedance of the planar transmission line where it connects to the rectifier substantially matches the impedance of the rectifier for both of the fundamental frequencies of the first and second radio frequency signals.

3. A dual-band converter according to claim 2, wherein the planar transmission line comprises:
    a first portion for receiving the first and second radio frequency signals, wherein the shorted stub and the fifth stub are connected to the first portion and spaced apart from each other along the planar transmission line;
    a second portion connected to the first portion, wherein the first and second stubs are connected to the second portion and spaced apart from each other along the planar transmission line;
    a third portion connected to the second portion, wherein the capacitor is connected to the third portion; and
    a fourth portion that is between the third portion and the rectifier, wherein the third and fourth stubs are connected to the fourth portion and spaced apart from each other along the planar transmission line.

4. A dual-band converter according to claim 1, wherein the planar transmission line is at least one of a stripline, microstrip, slotline, coplanar waveguide and a coplanar stripline transmission line.

5. A dual-band converter according to claim 2, wherein:
    the planar transmission line is a microstrip transmission line having a conductive trace; and
    the shorted stub, the first to fifth stubs and the capacitor comprise respective conductive traces that contact the conductive trace of the microstrip transmission line.

6. A dual-band converter according to claim 5, wherein:
    the first stub is arranged to reflect, during operation of the dual-band converter, as the component of the first harmonic of the first radio frequency signal received from the rectifier, a first harmonic having a guided wavelength $\lambda g/2$;
    the first stub has a length between 0.146 $\lambda g$ and 0.152 $\lambda g$ and a width between 0.0076 $\lambda g$ and 0.017 $\lambda g$;
    the second stub has a length between 0.098 $\lambda g$ and 0.10 $\lambda g$ and a width between 0.0076 $\lambda g$ and 0.017 $\lambda g$;
    the first and second stubs are spaced apart by between 0.030 $\lambda g$ and 0.131 $\lambda g$;
    the third stub has a length between 0.193 $\lambda g$ and 0.201 $\lambda g$, and a width between 0.0076 $\lambda g$ and 0.017 $\lambda g$;
    the fourth stub has a length between 0.130 $\lambda g$ and 0.135 $\lambda g$, and a width between 0.0076 $\lambda g$ and 0.035 $\lambda g$; and
    the third and fourth stubs are spaced apart by between 0.067 $\lambda g$ and 0.099 $\lambda g$.

7. A dual-band converter according to claim 6, wherein:
    the first stub has a length of 0.15 $\lambda g$ and a width of 0.011 $\lambda g$;
    the second stub has a length of 0.10 $\lambda g$ and a width of 0.011 $\lambda g$;
    the first and second stubs are spaced apart by 0.090 $\lambda g$;
    the third stub has a length of 0.20 $\lambda g$ and a width of 0.011 $\lambda g$;
    the fourth stub has a length of 0.13 $\lambda g$ and a width of 0.011 $\lambda g$; and
    the third and fourth stubs are spaced apart by 0.084 $\lambda g$.

8. A dual-band converter according to claim 5, wherein:
    the first stub has a length between 9.65 mm and 10.03 mm, and a width between 0.5 mm and 1.1 mm;
    the second stub has a length between 6.47 mm and 6.73 mm, and a width between 0.5 mm and 1.1 mm;

the first and second stubs are spaced apart by between 2.0 mm and 8.6 mm;

the third stub has a length between 12.72 mm and 13.25 mm, and a width between 0.5 mm and 1.1 mm;

the fourth stub has a length between 8.54 mm and 8.9 mm, and a width between 0.5 mm and 2.3 mm; and the third and fourth stubs are spaced apart by between 4.4 mm and 6.5 mm.

9. A dual-band converter according to claim 1, wherein the received radio frequency signals comprise frequency components in one or more of the VHF, UHF and SHF frequency band.

10. A dual-band converter operable to convert a first radio frequency signal in a first frequency band and a second radio frequency signal in a second frequency band that is separate from the first frequency band into a DC signal for powering a load, the converter comprising:

a rectifier arranged to generate, based on the first and second radio frequency signals, the DC signal and two or more harmonics of each of the first and second radio frequency signals during operation of the dual-band converter;

a planar transmission line arranged to guide the first and second radio frequency signals to the rectifier and to receive a component of each of the harmonics generated by the rectifier during operation of the dual-band converter;

a first filter, connected to the planar transmission line to reflect, during operation of the dual-band converter, a component of a first harmonic and a component of a second harmonic of the first radio frequency signal received from the rectifier, respectively; and a second filter connected to the planar transmission line and arranged to reflect, during operation of the dual-band converter, a component of a first harmonic and a component of a second harmonic of the second radio frequency signal received from the rectifier, respectively.

11. The dual-band converter of claim 10 wherein the first filter has a transfer function selected so that its contribution to the impedance of the planar transmission line causes reflection of the component of the first harmonic and the component of the second harmonic of the first radio frequency signal received from the rectifier.

12. The dual-band converter of claim 10 wherein the first filter comprises at least two spatially separate transitions in impedance along the transmission line.

13. The dual-band converter of claim 12 wherein the first filter comprises a first reactive impedance connected to the planar transmission line at a first location, and a second reactive impedance connected to the planar transmission line at a second location to provide the transitions in impedance.

14. The dual-band converter of claim 10 wherein the first filter comprises a first stub and a second stub each connected to the planar transmission line and arranged to reflect the component of the first harmonic and the component of the second harmonic of the first radio frequency signal received from the rectifier, respectively.

15. The dual-band converter of claim 10 wherein the first filter is a band pass filter.

16. The dual-band converter of claim 10 wherein the second filter has a transfer function selected so that its contribution to the impedance of the planar transmission causes reflection of the component of the first harmonic and the component of the second harmonic of the second radio frequency signal received from the rectifier.

17. The dual-band converter of claim 16 wherein the second filter comprises at least two spatially separate transitions in impedance along the transmission line.

18. The dual-band converter of claim 17 wherein the second filter comprises a third reactive impedance connected to the planar transmission line at a third location, and a fourth reactive impedance connected to the planar transmission line at a fourth location to provide the transitions in impedance.

19. The dual band converter of claim 18 wherein the second filter comprises a third stub and a fourth stub each connected to the planar transmission line and arranged to reflect the first harmonic and the component of the second harmonic of the second radio frequency signal received from the rectifier, respectively.

20. A dual-band radio frequency energy harvesting device, comprising:

a radio frequency antenna for receiving a first radio frequency signal in a first frequency band and a second radio frequency signal in a second frequency band that is separate from the first frequency band; and a dual-band converter according to claim 1, which is arranged to convert the radio frequency signals received by the antenna into a DC signal for powering a load.

* * * * *